US012793289B2

(12) United States Patent
Andrews et al.

(10) Patent No.: US 12,793,289 B2
(45) Date of Patent: Nov. 10, 2026

(54) RECOVERING AN OVERLAY OVER VIDEO WHEN USING SCREEN SHARING WITH CHROMA SUBSAMPLING

(71) Applicant: Microsoft Technology Licensing, LLC, Redmond, WA (US)

(72) Inventors: Matthew Andrews, Celina, TX (US); Isuru Chamara Pathirana, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 18/525,681

(22) Filed: Nov. 30, 2023

(65) Prior Publication Data

US 2025/0056018 A1 Feb. 13, 2025

Related U.S. Application Data

(60) Provisional application No. 63/531,801, filed on Aug. 9, 2023.

(51) Int. Cl.
*G06T 11/10* (2026.01)
*G06F 3/14* (2006.01)
(Continued)

(52) U.S. Cl.
CPC ............ *G06T 11/10* (2026.01); *G06F 3/1454* (2013.01); *G06T 7/90* (2017.01); *G06T 11/20* (2013.01);
(Continued)

(58) Field of Classification Search
CPC .... H04N 19/186; H04N 19/132; H04N 19/17; G06F 3/1454; G06T 7/90; G06T 11/001;
(Continued)

(56) References Cited

U.S. PATENT DOCUMENTS 9,848,198 B2 * 12/2017 Pu .......................... H04N 19/70
10,368,080 B2 7/2019 Holcomb et al.
(Continued)

OTHER PUBLICATIONS

International Search Report and Written Opinion received for PCT Application No. PCT/US2024/036465, Oct. 22, 2024, 14 pages.
(Continued)

*Primary Examiner* — Xiao M Wu
*Assistant Examiner* — Latrell Anthony Creary
(74) *Attorney, Agent, or Firm* — Klarquist Sparkman, LLP

(57) ABSTRACT

Techniques are described for recovering and applying an overlay over video while using a screen remoting application with chroma subsampling. At a server system hosting a screen remoting application, a screen image is constructed in which a video region is replaced with a display pattern of alternating pixel blocks of contrasting colors, and an overlay is drawn in the video region. The overlay includes an element that at least partially occludes the display pattern. After chroma subsampling is performed on the screen image, encoded data for the screen image is sent to a client computing device. The client computing device reconstructs the screen image, processes the screen image to generate an output overlay image, and renders the output overlay image on top of video in the video region.

20 Claims, 18 Drawing Sheets

(51) Int. Cl.

| | |
|---|---|
| ***G06T 7/90*** | (2017.01) |
| ***G06T 11/20*** | (2026.01) |
| ***G06T 11/60*** | (2026.01) |
| ***H04N 19/132*** | (2014.01) |
| ***H04N 19/17*** | (2014.01) |
| ***H04N 19/186*** | (2014.01) |

(52) U.S. Cl.
CPC ........... *G06T 11/60* (2013.01); *H04N 19/132* (2014.11); *H04N 19/17* (2014.11); *H04N 19/186* (2014.11); *G06T 2207/10016* (2013.01); *G06T 2207/10024* (2013.01); *G06T 2210/62* (2013.01)

(58) Field of Classification Search
CPC ..................... G06T 11/20; G06T 11/60; G06T 2207/10016; G06T 2207/10024; G06T 2210/62
See application file for complete search history.

(56) References Cited

U.S. PATENT DOCUMENTS

| | | | | |
|---|---|---|---|---|
| 11,012,485 | B1 | 5/2021 | Hinnant et al. | |
| 11,012,498 | B1 | 5/2021 | Hinnant et al. | |
| 2016/0165226 | A1* | 6/2016 | Djurdjevic | H04N 17/004 348/188 |
| 2017/0064330 | A1* | 3/2017 | Li | H04N 19/90 |
| 2018/0349283 | A1 | 12/2018 | Bhatia et al. | |
| 2019/0342378 | A1 | 11/2019 | Vysotsky et al. | |
| 2020/0036989 | A1* | 1/2020 | Heindel | H04N 19/33 |
| 2022/0159254 | A1* | 5/2022 | Xu | H04N 19/174 |
| 2023/0298299 | A1* | 9/2023 | Chen | H04N 7/15 |

OTHER PUBLICATIONS

International Preliminary Report On Patentability received for PCT Application No. PCT/US2024/036465, mailed on Feb. 19, 2026, 11 pages.

* cited by examiner

500

600

RECOVERING AN OVERLAY OVER VIDEO WHEN USING SCREEN SHARING WITH CHROMA SUBSAMPLING

RELATED APPLICATION INFORMATION

This application claims the benefit of U.S. Provisional Patent Application No. 63/531,801, filed Aug. 9, 2023, the disclosure of which is hereby incorporated by reference.

BACKGROUND

A client computing device can use a web browser in a server-hosted screen remoting application to display a web page. However, when displaying a web page with a video stream from the server, using the screen remoting application to handle the video stream can result in poor bandwidth utilization and low-quality video. To overcome these issues, the server hosting the screen remoting application may capture an encoded video stream, before it is decoded or rendered at the server, and send the encoded video stream to the client device to be decoded and rendered in a designated region of the web page. However, this can lead to loss of any overlay that the web page might draw over the video, such as an overlay that includes video control elements. Such overlays can include opaque or semi-transparent elements, such that the video is supposed to show through the overlay to some extent when the client decodes and renders the video, but instead the overlay is lost.

SUMMARY

Past approaches attempting to address the problem of recovering overlays on video content included website-specific cutouts for the shape of the overlay on a web page. However, as these cutouts do not allow transparency, semi-transparent overlays over video would become opaque because of the cutouts. For example, semi-transparent video control elements would be opaque and, as a result, completely obscure the underlying video. Also, these techniques were unsustainable because every website from which media was redirected could need a different, specific pattern of cutout.

Alternatives to the cutout approach include prior approaches which detect overlays automatically. These prior approaches assume that chroma information is retained at full resolution through encoding and decoding of the screen images, such as web pages constructed, encoded, and decoded by the screen remoting application. However, the screen remoting application may use a video encoding/decoding profile that applies chroma subsampling as pre-processing before encoding and chroma upsampling after decoding. For example, some screen remoting applications may encode and decode screen images consistent with a profile of the H.264/Advanced Video Coding (AVC) standard that accepts input in YUV 4:2:0 format. Screen remoting applications which use this encoding mode for screen images are incompatible with automatic overlay detection approaches that depend on chroma resolution being retained at full resolution, as half of the vertical chroma lines and half of the horizontal chroma lines of the video are lost when chroma subsampling produces input in YUV 4:2:0 format. Accordingly, a solution for preserving video overlays during screen sharing is needed which can accommodate semi-transparent overlays while also being compatible with screen remoting applications that use chroma subsampling before encoding.

In summary, the detailed description presents innovations in recovering an overlay over video displayed by a client computing device in a web browser of a server-hosted screen remoting application. The innovations described herein enable recovery of a high-fidelity blended overlay even when there is chroma loss due to screen images that include the overlay being encoded after chroma subsampling. Accordingly, the innovations described herein improve the experience of a user of client computing device when viewing videos in a web browser via a server-hosted screen remoting application.

Innovative features of server-side activity are described and claimed below. In particular, various aspects of a multimedia redirection (MMR) browser extension that modifies a web page by replacing a video element on the web page with a custom element that displays a pattern are described and claimed. For example, when a client computing device accesses a web page that includes a video element with an overlay via a web browser of a screen remoting application, the server hosting the screen remoting application can use the MMR browser extension to render a pattern where the video originally would have been rendered. The pattern can include alternating 2×2 blocks of contrasting colors, such as magenta and green, in a checkerboard pattern. The server-side web browser application then draws the overlay over the pattern. The resulting image is then encoded and streamed to the client computing device as the "screen" for the video. The encoding is preceded by chroma subsampling, which introduces chroma loss (e.g., conversion to a 4:2:0 color space for video encoding).

Innovative features of corresponding client-side activity are also described and claimed below. In particular, various aspects of a client computing device which executes a server-hosted screen remoting application and an MMR plugin are described and claimed. The client computing device reconstructs a screen image by decoding encoded data received from the server and performing chroma upsampling operations. After reconstructing the screen image, which includes the overlay drawn over the pattern, the MMR plugin on the client computing device recovers the overlay for the video. Recovery of the overlay can include performing an algorithm in which the expected pattern color is used to derive the original overlay image and transparency level, which can also be called an opacity value or alpha (α) value. Performance of the algorithm results in generation of an overlay image for the video element in which the pattern is replaced with transparency. The screen remoting application then outputs a web page to a display of the client computing device in which the overlay image generated by the MMR plugin is rendered on top of video for the video element. In this way, the original overlay, including any semi-transparent elements such as video control elements, is displayed on top of the video to preserve the user experience of the video which was intended for the web page.

The innovations described herein can be implemented as part of a method, as part of a computer system (physical or virtual, as described below) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

DETAILED DESCRIPTION

The detailed description presents innovations in recovering and applying an overlay over video when using a screen remoting application with chroma subsampling. The innovations can enable preservation of semi-transparent as well as opaque elements of a video overlay on a web page when the web page is viewed on a client computing device via a server-hosted screen remoting application, even when the screen remoting application uses chroma subsampling before encoding.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, any of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique or tool does not solve all such problems.

I. EXAMPLE NETWORK ENVIRONMENTS

Figure 1:
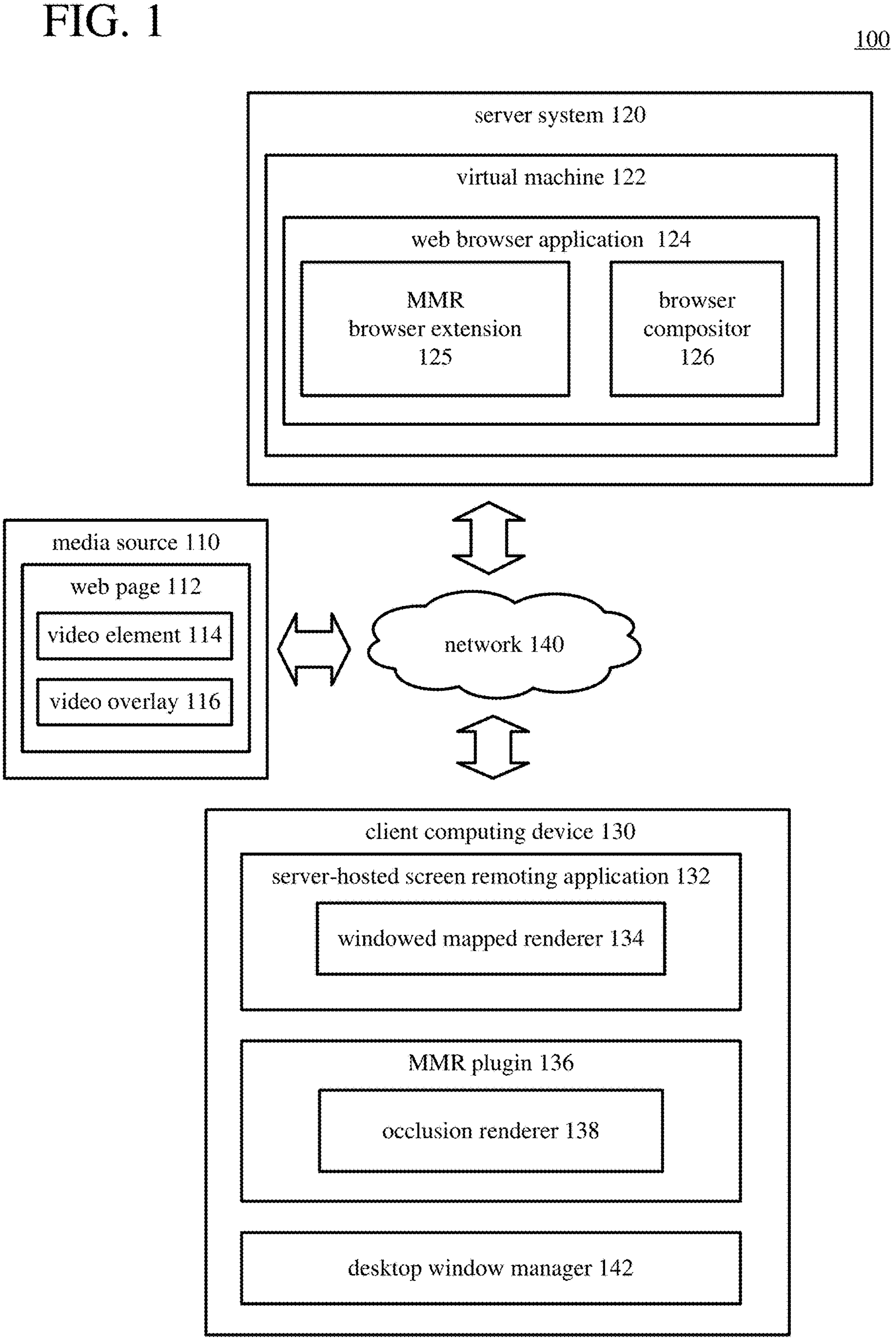
FIG. 1 is a diagram illustrating an example network environment in which some described embodiments can be implemented.

FIG. 1 shows an example network environment (100) that includes media source (110), server system (120), and client computing device (130). The media source (110), server system (120), and client computing device (130) are connected over a network (140) using an appropriate communication protocol. The network (140) can include the Internet or another computer network.

Media source (110) includes web page (112). Web page (112) includes a video element (114) and a video overlay (116). Video element (114) can refer to a portion of the web page in which frames of a video stream are rendered. Video overlay (116) can include one or more elements which are drawn on top of the video element. The elements of an overlay for a given video can include any combination of opaque, semi-transparent, and transparent elements. In some examples, the elements include user controls for the video stream such as a play button, pause button, fast forwarding button, rewind button, stop button, etc. Additionally or alternatively, video overlay (116) can include broad filter placed over a video element. For example, when a video is paused, a website will often put a semi-transparent filter over the entire video region, or a semi-transparent gradient where the a value varies from transparent to opaque from the top to the bottom of the video region. In such examples, there may also be another overlay element (e.g., a pause button) on top of the filter.

Server system (120) includes virtual machine (VM) (122). While a single VM (122) is depicted, server system (120) can include any number of VMs (122) without departing from the scope of this disclosure. VM (122) hosts a web browser application (124). Optionally, VM (122) can host a screen remoting service; in other examples, a screen remoting service can be hosted by the server system itself (e.g., hosted by a physical machine of the server system rather than a VM). In other examples, the web browser application can be hosted by a physical machine, rather than a VM, without departing from the scope of this disclosure.

Although some of the specific examples provided herein involve using MMR in the context of a web browser, the disclosed techniques can also be applied when MMR is used to present, as remote video, screen images from local applications (e.g., local applications executing on VMs or physical machines) or other non-website sources of screen images. For example, the disclosed techniques can be applied when MMR is used to present, as remote video, screen images from local applications that use HTML5, XAML, or both HTML5 and XAML, such as a streaming service's local web application for an operating system (e.g., the WINDOWS® operating system).

Web browser application (190) includes an MMR browser extension (125) and a browser compositor (126). As discussed further below with reference to FIG. 2, MMR browser extension (125) can modify a web page containing a video element by replacing the video element with a custom element which displays a pattern. Browser compositor (126), which can alternatively be referred to as a browser composition engine, serves to combine different graphical elements (e.g., text, images, videos) into a final visual output that is rendered on the screen. Towards this end, browser compositor (126) can manage the rendering of different layers.

Client computing device (130) communicates with media source (110) and server system (120) over network (140). Client computing device (130) includes a screen remoting application (132). Screen remoting application (132) includes a windowed mapped renderer (134), which can be an application programming interface (API).

Client computing device (130) further includes an MMR plugin (136). MMR plugin (136) includes an occlusion renderer (138). Upon receipt by MMR plugin (136) of a modified web page from MMR browser extension (125), occlusion renderer (138) can perform pattern removal and rendering of an occluding element overlay of the modified web page. Further, occlusion renderer (138) can implement an interface to integrate rendering with windowed mapped renderer (134).

In addition, client computing device (130) includes a desktop window manager (DWM) (142). As discussed further below with reference to FIG. 4, DWM (142) can help to ensure that occluding elements are properly rendered on top of video frames.

Although the network environment (100) depicted in FIG. 1 includes a single client computing device (130), the network environment (100) can instead include multiple client computing devices (130) each executing a screen remoting application hosted by server system (120). Similarly, although a single media source (110) is shown in network environment (100), any number of media sources (e.g., different websites hosting video streams) can be present without departing from the scope of this disclosure.

II. EXAMPLE PROCESSING FLOWS

Figure 2:
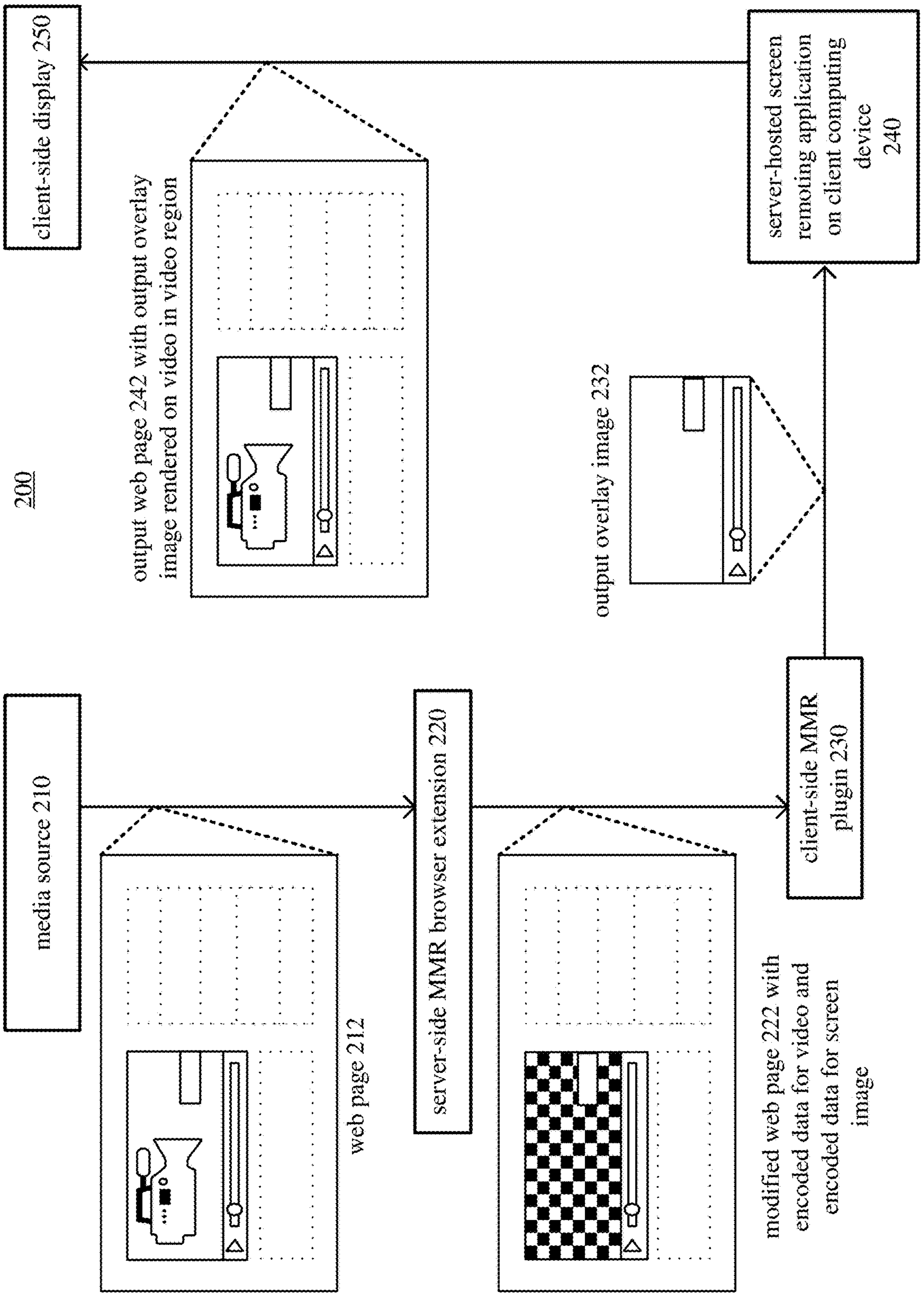
FIG. 2 is a diagram of an example processing flow when recovering an overlay over video processed using screen sharing with chroma subsampling.

FIG. 2 shows an example processing flow (200) when recovering an overlay over video processed using screen sharing with chroma subsampling. The processing flow (200) involves activities carried out by a media source (210), a server-side multimedia redirection (MMR) browser extension (220), a client-side MMR plugin (230), a server-hosted screen remoting application (240) executed on a client computing device, and a client-side display (250).

The media source (210) provides a web page (212) including a video region and one or more other elements to an MMR browser extension (220) of a server system, such as server system (120) of FIG. 1. The video region includes a video element populated by a video and an overlay. The overlay can include one or more user controls for the video (e.g., custom transport controls), some of which are transparent or semi-transparent.

Server-side MMR browser extension (220) receives web page (212) from media source (210) and modifies web page (212) by constructing a screen image that includes a video region. After constructing the screen image, the server-side MMR browser extension (220) replaces the video region of the screen image with a custom element which displays a pattern, draws an overlay comprising an element that at least partially occludes the display pattern, and encodes the screen image to produce encoded data for the screen image. Encoding the screen image can be preceded by chroma subsampling, which induces chroma loss in the screen image. The final output of the browser compositor on the server side (e.g., browser compositor 126 of FIG. 1) is a modified web page (222), which is processed with chroma subsampling operations and encoded. Thus, the modified web page (222) is represented in the encoded data for the screen image. Encoded data for the video element to be rendered in the video region can be separately processed with different video encoding operations, apart from the screen remoting application.

Figure 3:
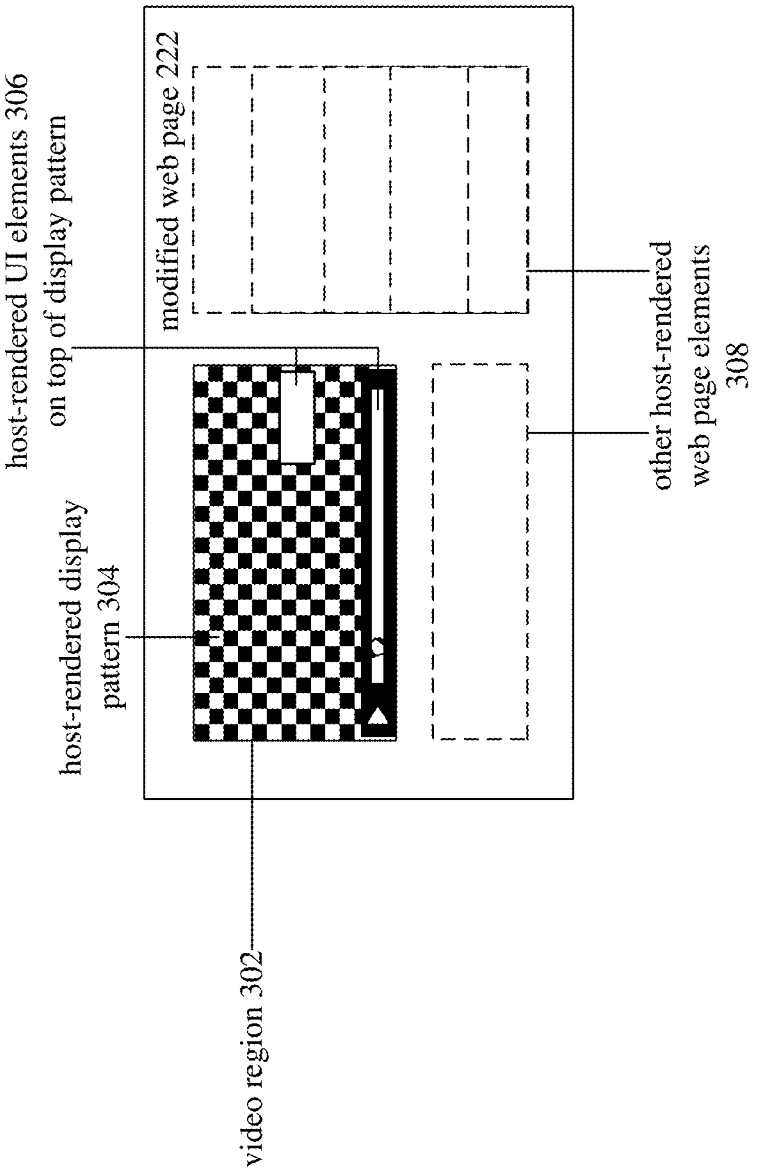
FIG. 3 is a diagram of an example modified web page generated by a server-side MMR browser extension using the processing flow of FIG. 2.

A detailed view of an example modified web page (222) is shown in FIG. 3. In the depicted example, modified web page (222) includes a video region (302), which can alternatively be referred to as a virtual window. Whereas in the original version of the web page (e.g., web page (212) of FIG. 2), the video region was populated by a video element, video region (302) is instead populated by a host-rendered display pattern (304) inserted by the server-side MMR browser extension (220). Modified web page (222) further includes host-rendered UI elements (306) which are visible on top of the display pattern (304) in video region (302). A UI element (306) can alternatively be referred to as an occluding element. As shown, modified web page (222) also optionally includes one or more other host-rendered web page elements (308) outside of the video region. Examples of web page elements 308 can include text, clickable links, advertisements, etc.

Returning to FIG. 2, server-side MMR browser extension (220) provides modified web page (222), as encoded data for the screen image, to a client-side MMR plugin (230) of a client computing device (e.g., client computing device 130 of FIG. 1). The screen image is reconstructed by decoding the encoded data for the screen image and performing chroma upsampling operations on the screen image. Client-side MMR plugin (230) processes the area of the screen image corresponding to the video element to remove the pattern. For example, client-side MMR plugin (230) can take the area of the host-rendered output which overlaps with the target video position and process the image to replace the pixels containing the pattern with transparency, thereby generating an output overlay image (232).

Client-side MMR plugin (230) provides the generated output overlay image (232) and the video frames to server-hosted screen remoting application (240). The screen remoting application (240) displays the video frames and the output overlay image (232) on the screen at the correct location and size (e.g., at the location and size provided by the server-side MMR browser extension (220)), so as to render the output overlay image (232) on top of the video in the video region. Put another way, MMR plugin (230) causes output overlay image (232) (containing occluding elements with transparency) to be displayed on top of video frames of the video being rendered. The occluding elements are thus displayed correctly over the video in the output web page (242) generated by the screen remoting application (240). The output web page (242) can then be displayed to a user of the client computing device via client-side display (250) with the occluding elements displayed correctly over the video. Client-side display (250) can refer to a screen or monitor of a client computing device.

III. EXAMPLE CLIENT-SIDE SYSTEM ARCHITECTURE

Figure 4:
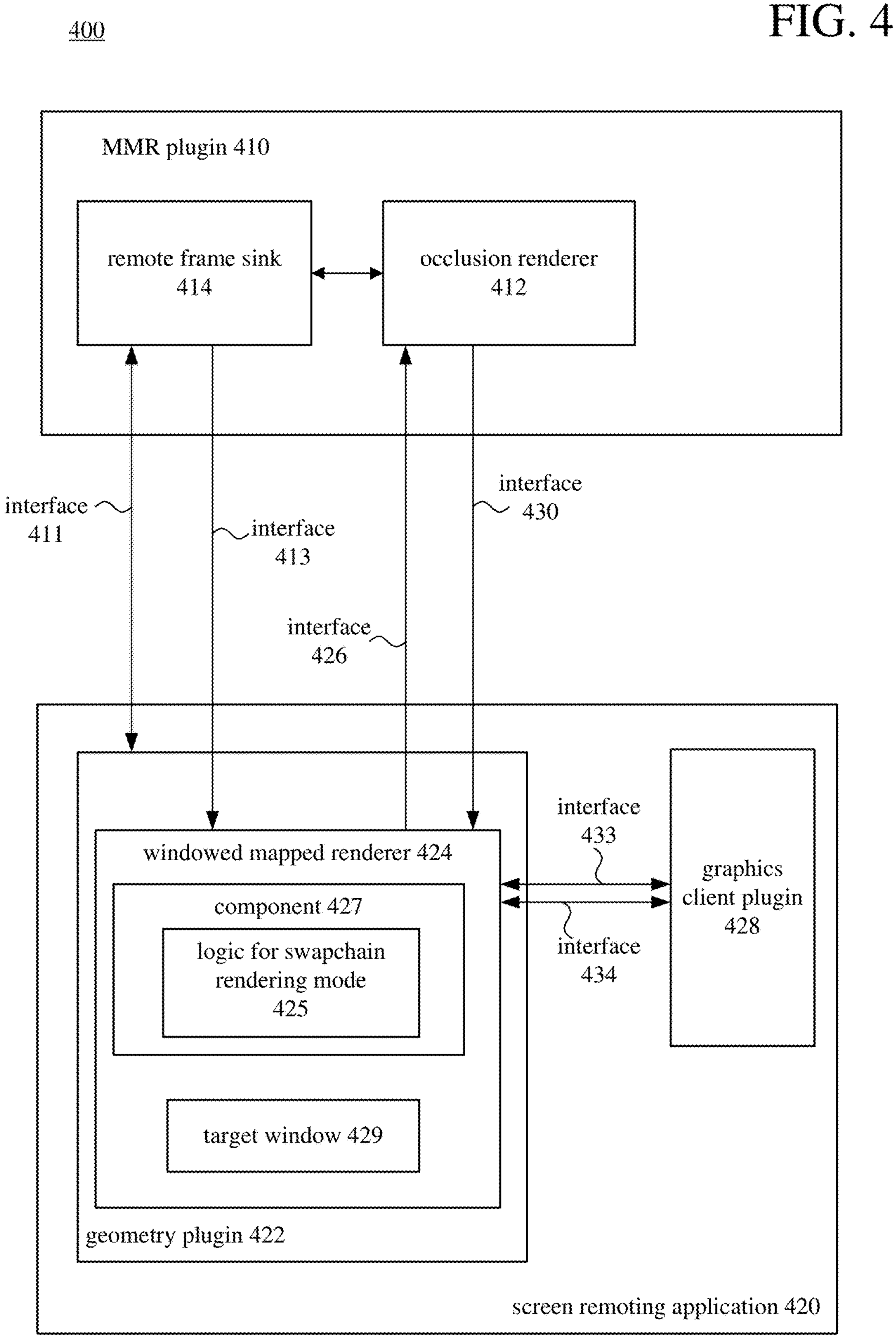
FIG. 4 is a diagram illustrating an example high-level overview of system components and their interactions, in conjunction with which some described embodiments can be implemented.

FIG. 4 shows an example client-side system architecture (400) in some example implementations. Architecture (400) includes an MMR plugin (410) of a client computing device (e.g., client computing device (130) of FIG. 1) which interacts with a server-hosted screen remoting application (420) (e.g., remote desktop client) of the client computing device via several interfaces. MMR plugin (410) can correspond to client-side MMR plugin (230) of FIG. 2. Screen remoting application (420) can correspond to server-hosted screen remoting application (240) of FIG. 2.

A. Windowed Mapped Renderer.

Screen remoting application (420) includes a geometry plugin (422). Geometry plugin (422) can be configured to track the locations and sizes of remoted videos on the remoted VM (e.g., the VM hosting the web browser application). Towards this end, geometry plugin (422) includes a windowed mapped renderer (424). Geometry plugin (422B) can provide updates to windowed mapped renderer (424) regarding the correct position and size for the remoted videos; these updates can alternatively be referred to as graphics subregion updates. Windowed mapped renderer (424) can in turn communicate the graphics subregion updates to an occlusion renderer (412) within MMR plugin (410) via an interface (426). Further, windowed mapped renderer (424) can facilitate external rendering of the overlay layer on top of the contents of windowed mapped renderer (424) (e.g., video frames).

One example pre-existing rendering mode for a windowed mapped renderer, such as windowed mapped renderer (424), is a mode in which graphics are rendered using a device context and a render target. The device context can be an object that enables drawing with a hardware-accelerated two-dimensional graphics API that uses the GPU to speed up the rendering process, along with application of effects. The render target can be an object that represents a window or a portion of a window where one can draw with the hardware-accelerated two-dimensional graphics API. Another example pre-existing rendering mode for a windowed mapped renderer is a mode in which two-dimensional and three-dimensional graphics are rendered to the same swapchain. A swapchain is a collection of buffers that are used to display images on the screen to avoid flickering and tearing effects when rendering graphics. Existing rendering modes such as these can be inefficient when performing overlay rendering.

Example APIs that can perform rendering include the Direct2D API and the Direct 3D 11 API of the DirectX® collection of APIs, the OpenGL API, the Vulkan API, the Metal API, and the Simple and Fast Multimedia Library (SFML) API.

i. Overlay Layer Rendering.

Overlay layer rendering can be performed to improve the efficiency of asynchronous rendering of the overlay layer by an external component hosted in a dynamic video channel (DVC) plugin. A separate hardware overlay layer, when available on the system, can be used for the overlay layer contents. This approach can be relatively efficient as the windowed mapped renderer contents (e.g., video frames in the case of MMR) can be updated independently of the occluding elements.

Examples of APIs and frameworks that can facilitate overlay layer rendering include the direct composition (DCOMP) feature of WINDOWS®, the Qt Graphics View Framework, the Open GL API, and the Android Graphics Framework.

Towards this end, windowed mapped renderer (424) can employ a swapchain rendering mode (425) as an alternative to other pre-existing rendering modes such as those discussed above. As shown in FIG. 4, logic for rendering mode (425) can be encapsulated in class (427) of windowed mapped renderer (424) as shown. In particular, class (427) uses graphics APIs, such as those discussed above, to render graphics to an output surface referred to as a target or visual.

When operating in accordance with rendering mode (425), a target window (429) of the windowed mapped renderer can host multiple visuals. For example, as described further below, two visuals can be hosted in the same target window (429). The first visual can be used to render the decoded video that was transmitted by the server, and the second visual can be used to render the overlay image generated by occlusion renderer (412). The two visuals can then be blended together using an a value generated by occlusion renderer (412).

Figure 5:
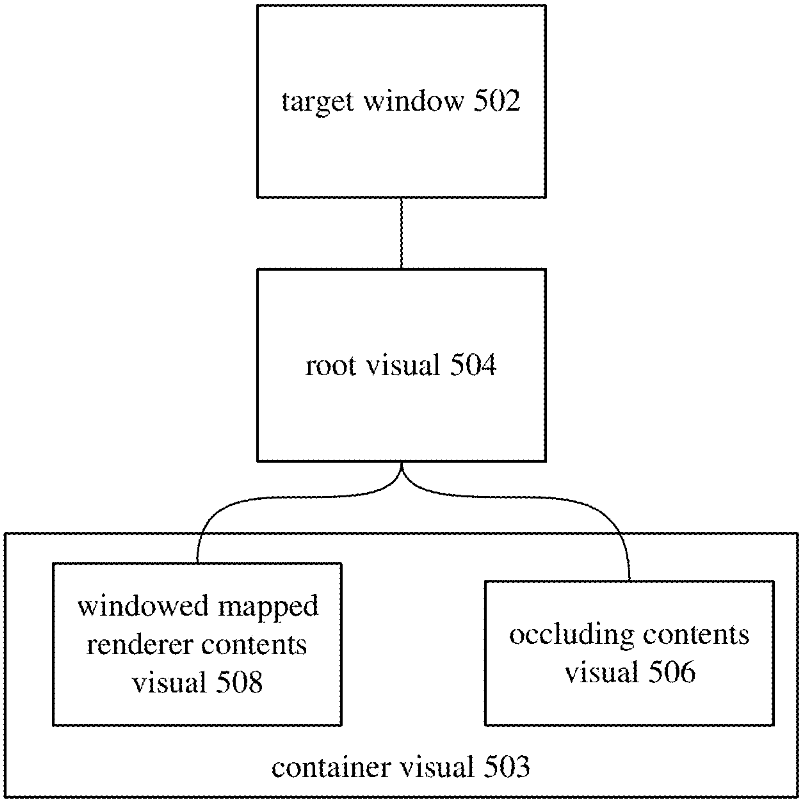
FIG. 5 shows an example visual tree diagram associated with direct-composition-based rendering, in conjunction with which some described embodiments can be implemented.

An example visual tree diagram (500) associated with rendering mode (425) is shown in FIG. 5, in which target window (502) corresponds to target window (429) of FIG. 4. A container visual (503) containing two separate visuals can be set as a root visual (504) of the target. The two separate visuals can include an occluding contents visual (506) for the overlay content and a windowed mapped renderer contents visual (508) for the main contents of the windowed mapped renderer (e.g., video frames).

DVC plugins of client computing devices, such as MMR plugin (410) of FIG. 4, can opt into the usage of rendering mode (425) with occlusion rendering support via an interface (430) between occlusion renderer (412) and windowed mapped renderer (424). For example, an application can set an external surface to be used for the contents associated with the windowed mapped renderer content visual (508). This allows video rendering to be performed externally, rather than having the windowed mapped renderer (424) manage the presentation of video frames onto a swapchain. Put another way, this technique can allow for native-like media-engine-based rendering with MMR.

In other examples, however, video rendering can be performed internally by the windowed mapped renderer (424). In such examples, an interface (411) between a remote frame sink (414) of MMR plugin (410) and geometry plugin (422) and an interface (413) between remote frame sink (414) and windowed mapped renderer (424) can be used. In particular, interface (411) can be used to obtain the windowed mapped renderer (424). Geometry plugin (422) can track the location and size of the video on the server (e.g., server system 120 of FIG. 1), and ensure the window mapped renderer (424) is at the right location and size on the screen at the client computing device (e.g., client computing device 130 of FIG. 1). Remote frame sink (414) can receive uncompressed video frames that were decoded from the stream sent by the server and then provide uncompressed video frames for the windowed mapped renderer (424) to render to the screen at the client computing device.

The logic for rendering the overlay image with occluding elements (e.g., overlay image 232 of FIG. 2) can be encapsulated within MMR plugin (410), for example, in occlusion renderer (412). Including the pattern removal logic within the MMR plugin can advantageously provide more flexibility. For example, the selected pattern and the pattern removal algorithm can be updated without influencing the behavior of any other DVC plugins on the system which also leverage the windowed mapped renderer functionality of the screen remoting application.

Screen remoting application (420) can provide the contents of a screen image for a desktop region corresponding to a window area of windowed mapped renderer (424). Further, the screen remoting application (420) can facilitate the rendering of the overlay image on top of the windowed mapped renderer contents.

The occlusion renderer (412) of MMR plugin (410) is discussed in further detail in a subsequent section. However, of relevance to the rendering behavior is that the interface (426) between windowed mapped renderer (424) and occlusion renderer (412) involves a method which allows windowed mapped renderer (424) to obtain a surface handle associated with an internal swapchain of occlusion renderer (412). This surface handle can be used to create a surface instance, which in turn can be set as the contents of occluding contents visual (506).

With the visual tree set up as shown in FIG. 5, a DWM of the client computing device, such as DWM 142 of FIG. 1, can ensure that the occluding contents visual (506) is rendered on top of the windowed mapped renderer contents visual (508). For example, when rendering the desktop, the DWM can leverage an overlay plane or use another graphics API to perform blending itself.

ii. Graphics Subregion Updates.

Existing windowed mapped renderer implementations do not have access to desktop region contents; in such implementations, the desktop region contents are only accessible within one or more subregions in the graphics client plugin. In accordance with the disclosed techniques, two interfaces are introduced to allow windowed mapped renderer (424) to communicate with the graphics client plugin (428): interface (433) and interface (434).

Interface (434) allows the graphics client plugin (428) to notify the windowed mapped renderer (424) of subregion updates. Interface (433) can be used by windowed mapped renderer (424) to register itself to graphics client plugin (428) as an output surface consumer. Accordingly, interfaces (433) and (434) provide a means for the MMR plugin (410) to communicate desktop image areas of interest to the graphics client plugin (428), and for the graphics client plugin (428) to provide the image corresponding to those areas whenever the graphics client plugin (428) updates.

B. Graphics Client Plugin.

As discussed above, graphics client plugin (428) can implement interface (433) to communicate with windowed mapped renderer (424). In some examples, graphics client plugin (428) acts as a thin wrapper which delegates calls made via interface (433) to the last instance of a channel created by graphics client plugin (428). The channel can be updated to keep track of output surface consumer registration data.

C. Occlusion Renderer.

Occlusion renderer (412) is an internal component of MMR plugin (410) which handles pattern removal and rendering the occluding element overlay. Occlusion renderer (412) implements interface (426) to receive input from windowed mapped renderer (424). The input can include the area of the desktop image of interest. For example, graphics client plugin (428) can provide the desktop image to windowed mapped renderer (424), and then windowed mapped renderer (424) can provide the area of the desktop image of interest to occlusion renderer (412) via interface (426).

Figure 6:
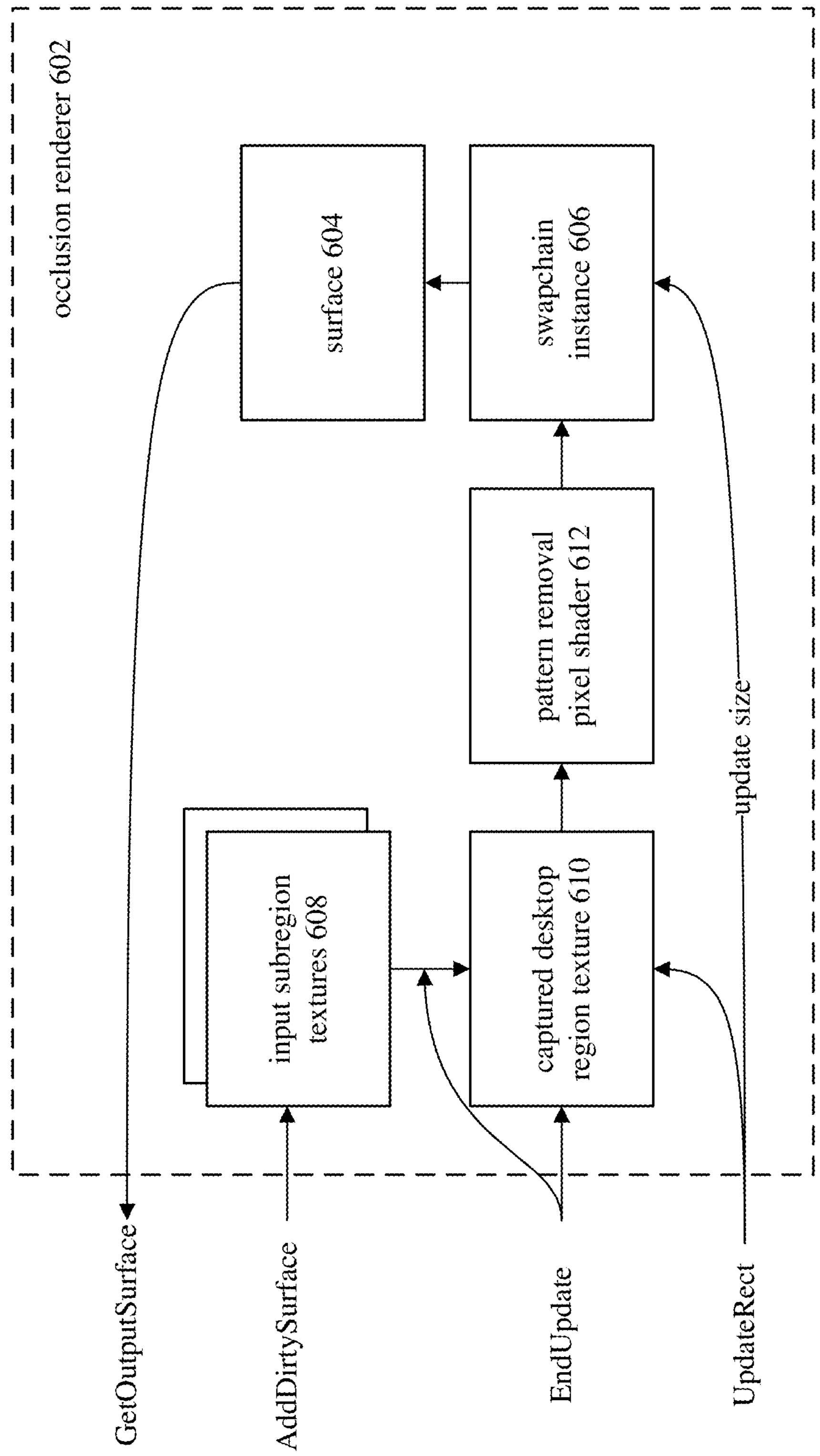
FIG. 6 is a diagram illustrating an example processing flow for an occlusion renderer, in conjunction with which some described embodiments can be implemented.

FIG. 6 depicts a diagram (600) of example architecture of an occlusion renderer (602), which may correspond to occlusion renderer (412) of FIG. 4, along with interactions between occlusion renderer (602) and other components, in some example implementations.

Occlusion renderer (602) can provide a windowed mapped renderer implementation with a duplicated handle to a surface (604) which it creates internally. Surface (604) can be associated with a swapchain instance (606) which is managed by occlusion renderer (602). The occluding overlay image contents are rendered to this swapchain. In some examples, surface (604) is a DCOMP surface.

The windowed mapped renderer can notify occlusion renderer (602) of an update to the desktop region which covers the mapped renderer area and provide textures containing contents of the updated regions. Occlusion renderer (602) maintains a list of input subregion textures (608), and when an EndUpdate method is called, occlusion renderer (602) copies the updated regions of these input textures into a single captured desktop region texture (610) to be processed.

When the EndUpdate method is called, the processing of the captured desktop region and the rendering of the final overlay image with the pattern removed is triggered. The pattern removal is performed using a custom pattern removal pixel shader (612) in the graphics pipeline, which implements the algorithm for pattern removal discussed below.

An UpdateRect method is called by the windowed mapped renderer (e.g., windowed mapped renderer 424 of FIG. 4) to inform occlusion renderer (602) of updates to the size of the desktop region which the windowed mapped renderer covers. Occlusion renderer (602) handles this call by resizing the swapchain and the captured desktop region texture (610).

IV. EXAMPLE TECHNIQUES FOR RECOVERING AN OVERLAY OVER VIDEO WHEN USING SCREEN SHARING WITH CHROMA SUBSAMPLING

A. Screen Image Generation, Chroma Subsampling, and Encoding.

Figure 7:
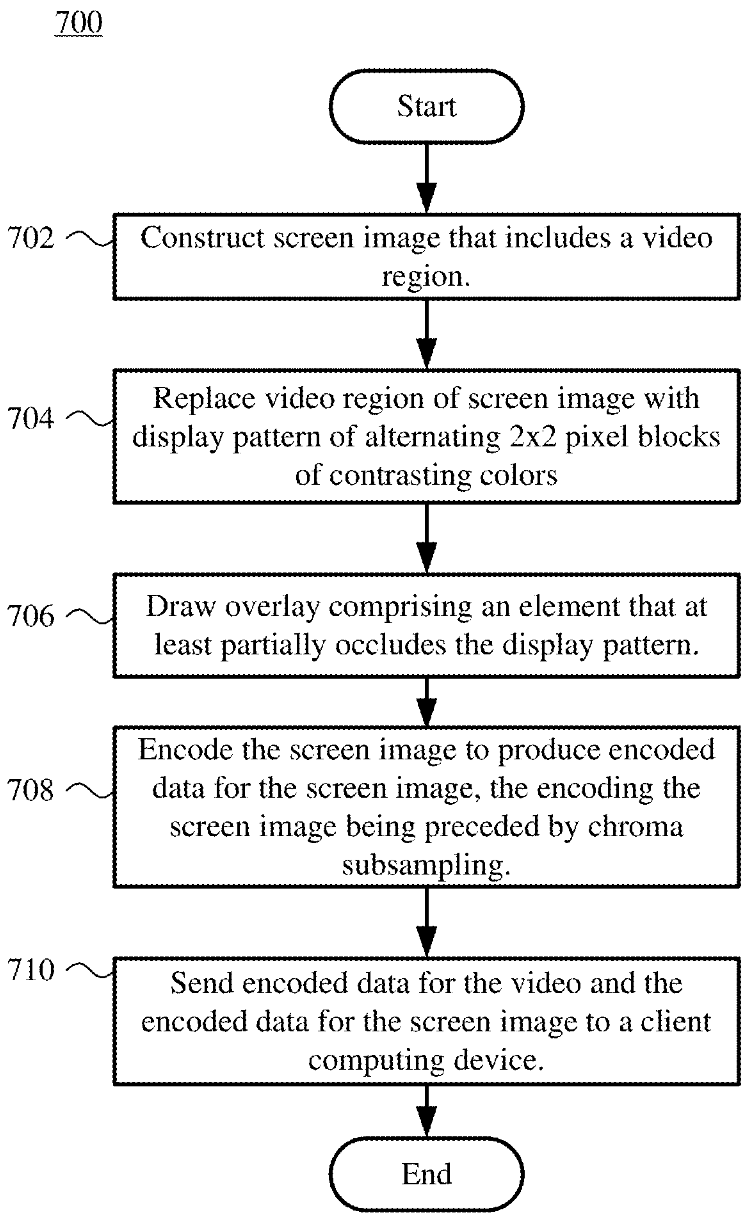
FIG. 7 is a flowchart illustrating an example technique for processing an overlay over a video region to generate and encode a screen image.

FIG. 7 depicts a generalized technique (700) performed by a server system to facilitate video overlay recovery at a client computing device which, for example, accesses a web page with video using a web browser within the screen remoting application. Towards this end, the server system processes an overlay over a video region to generate a screen image. A server system including a web browser application with an MMR browser extension, such as server system (120) described with reference to FIG. 1, can perform the technique (700). Alternatively, a server system that implements another screen remoting service can perform the technique (700).

First, a screen image that includes a video region is constructed (702). Next, a video region of the screen image is replaced (704) with a display pattern of alternating 2×2 pixel blocks of contrasting colors. As discussed above with reference to FIG. 2, a server-side MMR browser extension can perform these actions. In the examples described herein, the contrasting colors are magenta and green. However, it is contemplated that other contrasting colors could possibly be used for the pixel blocks, such as yellow (1.0, 1.0, 0.0) and blue (0.0, 0.0, 1.0). The Euclidean distance between yellow and blue in RGB format is the square root of 3 (that is, the square root of $(1.0\text{-}0.0)^2+(1.0\text{-}0.0)^2+(0.0\text{-}1.0)^2$). More generally, the contrasting colors can be selected such that the color difference between the two colors is as large as possible, or at least larger than a threshold color difference (e.g., a Euclidean distance of at least 1.5 between the two contrasting colors).

Pixel blocks can be alternatively referred to as pixel squares or chroma blocks. By using 2×2 pixel blocks rather than 1×1 pixel blocks, the pattern removal algorithm can account for chroma loss that occurs when the AVC 4:2:0 encoding profile is used for screen encoding of constructed screen images having a video region replaced by a display pattern, while still enabling recovery of a high-fidelity blended overlay. However, it is contemplated that other pixel block sizes (e.g., larger than 2×2) could be used. Further, it is contemplated that pixel clusters that form shapes other than squares or blocks could be used (e.g., a pixel cluster forming a diamond shape).

Certain benefits are achieved by using a two-color pattern, as opposed to a pattern with fewer or more than two contrasting colors. For example, a two-color pattern allows for the efficient recovery of semi-transparent occluding elements, which are commonly used as occluding video controls on many websites. Further, using a two-color pattern significantly reduces the possibility of an occluded element pixel being incorrectly categorized as a background pattern pixel.

In some examples, the alternating 2×2 pixel blocks of contrasting colors form a checkerboard pattern. Using a checkboard pattern as the display pattern can maximize contrast (e.g., maximize the number of chroma edges), which facilitates the determination of which pixels belong to the display pattern versus the overlay. However, it is contemplated that another type of pattern could be used as the display pattern in the disclosed techniques (e.g., a pattern made up of areas of contrasting colors which is not a checkerboard pattern).

After the video region has been replaced with the display pattern, an overlay is drawn (706). In many cases, the overlay comprises an element that at least partially occludes the display pattern. While a single element is described here for the sake of simplicity, the overlay can include multiple elements that at least partially occlude the display pattern in other examples. The element that at least partially occludes the pattern can be a semi-transparent element or an opaque element. For example, the element can be a video control element that covers part of the display pattern. Or, as another example, the element can be a semi-transparent filter that substantially covers the display pattern. In some examples, the overlay is drawn by a browser compositor on the server side (e.g., browser compositor 126 of FIG. 1).

After the overlay is drawn, the screen image is encoded (708) to produce encoded data for the screen image. In the depicted example, the process of encoding the screen image is preceded by performing chroma subsampling on the screen image (e.g., in accordance with input processing for input frames according to the AVC 4:2:0 encoding mode). When a screen image is encoded using the AVC 4:2:0 encoding mode, the format of the input screen image may be a 4:2:0 YUV format. YUV is a color representation format which represents color as separate components. In this format, Y represents luma or brightness, and U and V represents chrominance or color difference values.

For example, before chroma subsampling and encoding, the browser compositor can blend the pattern with the at least partially occluding element to generate a modified web page (222). The modified web page can also optionally include one or more other host-rendered web page elements outside of the video region, such as web page elements (308) discussed above with reference to FIG. 3. The modified web page (222) is then processed with chroma subsampling operations and encoded.

The encoded data for the video can be processed separately, as a separate encoded video stream. For example, the encoded data for the video can be processed with a different video encoder or the same video encoder, using the same profile or a different profile.

The encoded data for the video and the encoded data for the screen image is then sent (710) to the client computing device. For example, the server system can send the encoded data for the video and the encoded data for the screen image to a client-side MMR plugin such as client-side MMR plugin 330 of FIG. 2. After (710), technique (700) ends.

In some examples, certain operations of FIG. 7 such as chroma subsampling and encoding can be performed by a component of the server system referred to as a screen remoting service. The screen remoting service can be executed on a virtual machine hosted by the server system, or on the server system itself. In such examples, the screen remoting service can handle capturing the desktop image, subsampling the chroma if necessary, encoding the image, and sending the encoded bitstream to the screen remoting application on the client (e.g., server-hosted screen remoting application (132) of FIG. 1). The screen remoting service can also be responsible for tracking the location of video windows on the server system when requested to do so by the MMR browser extension, and then communicating updates to the geometry plugin in the screen remoting application on the client.

FIG. 7 shows server-side operations performed when processing a single screen image. In practice, the server-side operations can be repeated on a picture-by-picture basis for screen images of a sequence.

B. Overlay Recovery Algorithm.

Figure 8:
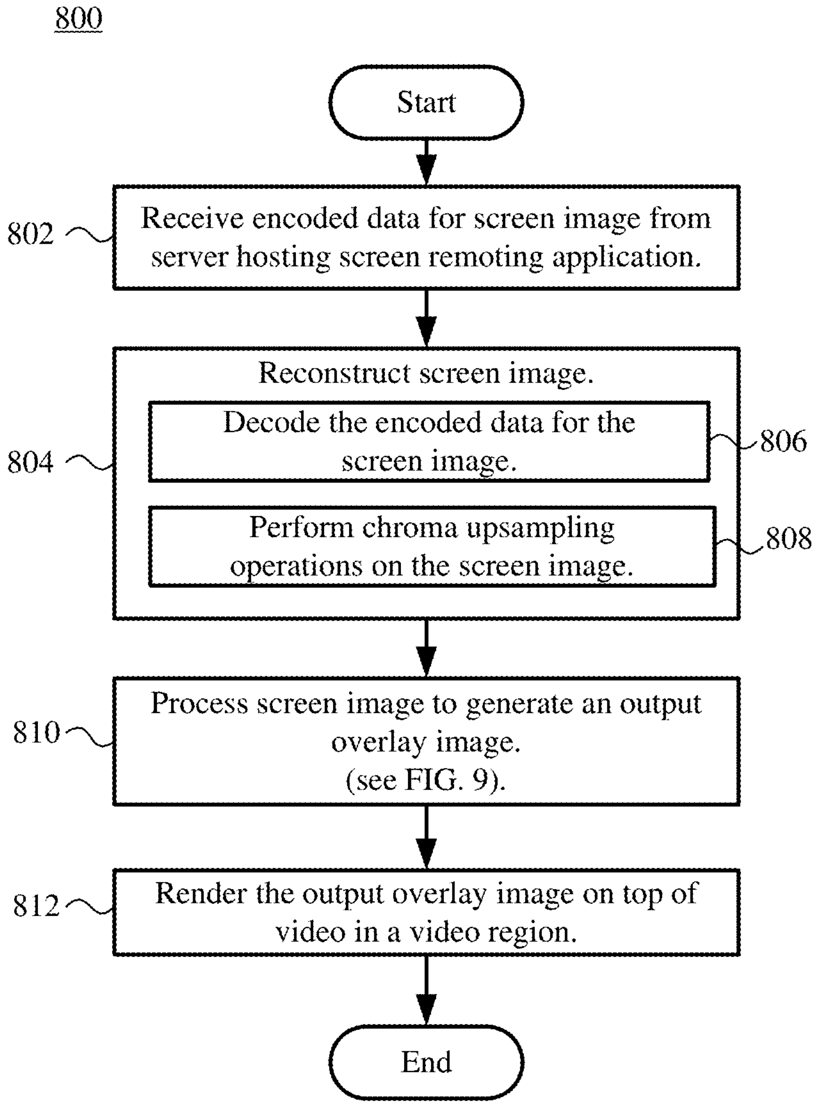
FIG. 8 is a flowchart illustrating an example technique for client-side overlay recovery.
Figure 9:
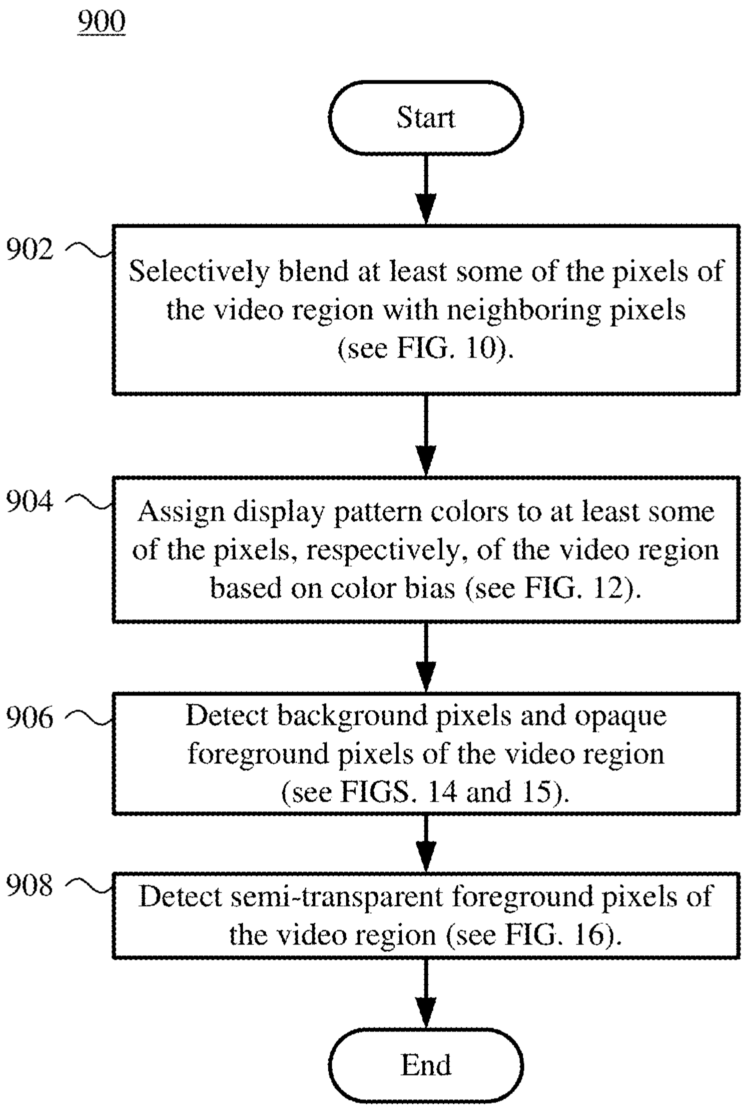
FIG. 9 is a flowchart illustrating an example technique for processing a screen image to generate an output overlay image.

FIGS. 8-9 depict generalized techniques (800) and (900), respectively, which can be performed in tandem to recover a video overlay for rendering at a client computing device. A client computing device which executes a screen remoting application and an MMR plugin, such as client computing device (130) as described with reference to FIG. 1, can perform techniques (800) and (900). Alternatively, a client computing device that implements another screen remoting application can perform the technique (700). Technique (800) can be performed upon completion of technique (700), and technique (900) can be performed at step (810) of technique (800).

First, encoded data for a screen image is received (802) at the client computing device from the server hosting the screen remoting application. The encoded data for the screen image can include the encoded data for the screen image sent at step (710) of technique (700).

Next, the screen image is reconstructed (804). In the depicted example, reconstructing the screen image includes decoding (806) the encoded data for the screen image and performing chroma upsampling operations (808) on the screen image.

The screen image is then processed (810) to generate an output overlay image. An example technique for processing a screen image to generate an output overlay image, which can alternatively be referred to as performing an overlay recovery algorithm, is described below with reference to FIG. 9.

The output overlay image generated at (810) is then rendered (812) on top of video in a video region. For example, as discussed above with reference to FIG. 2, the screen remoting application can generate an output web page which includes the output overlay image rendered on top of video in a video region of a web page. In some examples, other elements of the web page that are located outside of the video region are also rendered by the screen remoting application. The output web page can then be displayed on a display of the client computing device. After (812), technique (800) ends.

FIG. 8 shows client-side operations performed when processing a single screen image. In practice, the client-side operations can be repeated on a picture-by-picture basis for screen images of a sequence.

FIG. 9 depicts a generalized technique (900) for processing a screen image to generate an output overlay image. As noted above, technique (900) can be performed at step (810) of technique (800).

Technique (900) starts by selectively blending (902) a first group of the pixels of the video region with neighboring pixels. A pixel of the video region can be a pixel of the display pattern, which is processed as a background pixel, or a pixel of an overlay, which is processed as a foreground pixel that at least partially occludes a pixel of the underlying display pattern. Chroma subsampling and lossy encoding can introduce discrepancies in color values of pixels of the display pattern. Blending can smooth out chroma edges that have been introduced. An example technique for blending a current pixel of the video region is described below with reference to FIG. 10. Display pattern colors are then assigned (904) to a second group of the pixels of the video region, respectively, based on color bias. For example, for each pixel of the video region, one of the display pattern colors is assigned in order to indicate which of the two display pattern colors applies for that pixel. An example technique for detecting pattern colors is described below with reference to FIG. 12. The first and second groups of pixels can be different groups of pixels, or alternatively, the first and second groups of pixels can include one or more common pixels.

Next, background pixels (for parts of the video region not occluded at all by the overlay) and opaque foreground pixels (for parts of the video region completely occluded by the overlay) of the video region are detected (906). An example technique for detecting background pixels is described below with reference to FIG. 14, and an example technique for detecting opaque foreground pixels is described below with reference to FIG. 15.

Semi-transparent foreground pixels of the video region are then detected (908). In particular, for pixels of the video region that are not background pixels or opaque foreground pixels, color values and a values are determined. An example technique for detecting semi-transparent foreground pixels is described below with reference to FIG. 16. After (908), technique (900) ends.

i. Current Pixel Blending.

When the client video decoding pipeline generates a 4:4:4 image in red, green, blue (RGB) format to render to the screen from a 4:2:0 YUV decoded screen image, it will attempt to recover the original chroma. A 2×2 block with the same color of a display pattern (such as green or magenta) may have variance from the original screen image because the chroma recovery algorithm will not be able to perfectly recover the original chroma values. In particular, distortion introduced by chroma sub-sampling/upsampling or encoding can lead to chroma edges in the overlay image that were not present in the original pattern or overlay image generated on the server. To smooth out these edges and avoid obvious artifacts in the overlay, pattern pixels are first blended with neighboring pattern pixels of the same color.

Figure 10:
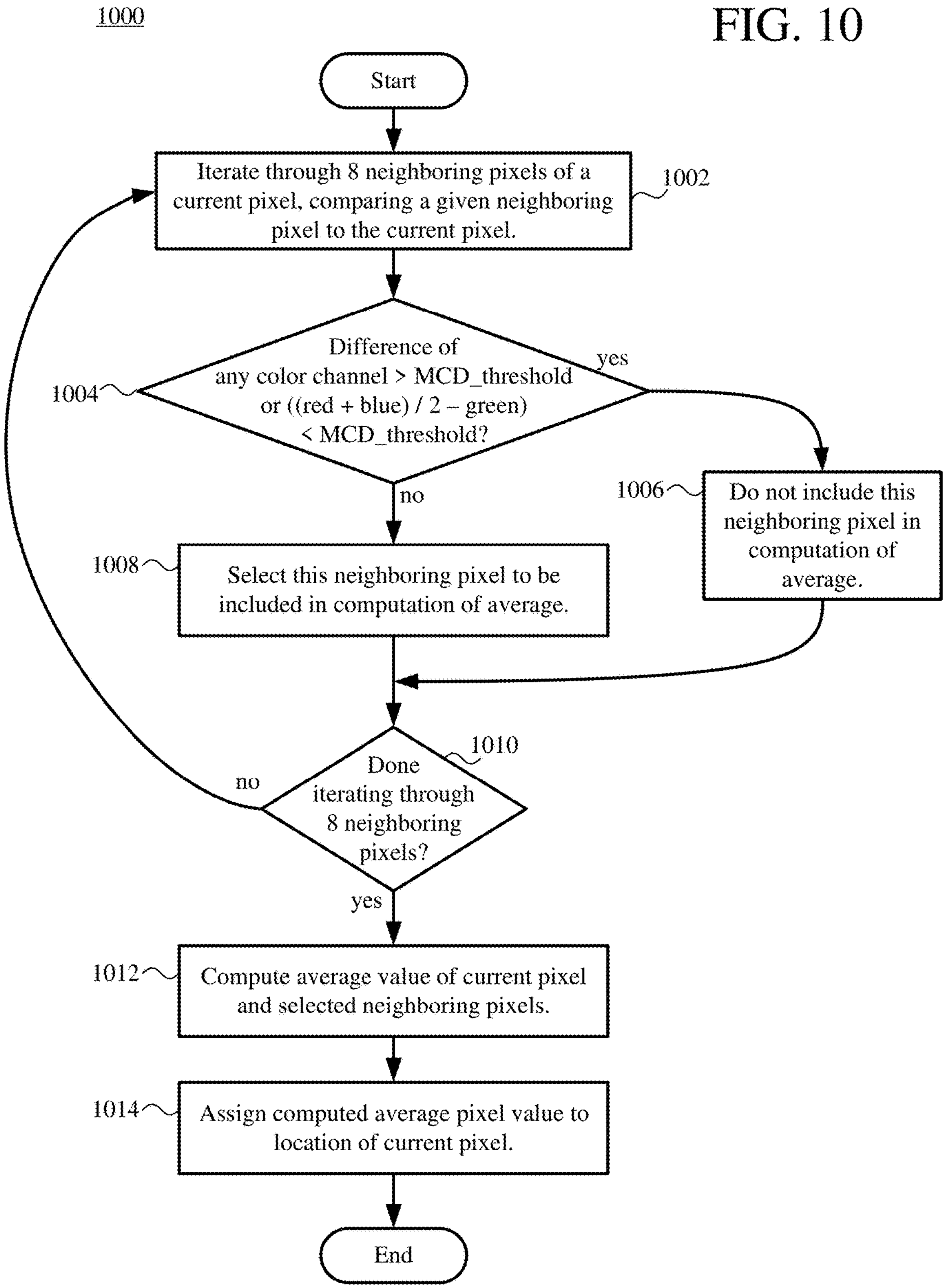
FIG. 10 is a flowchart illustrating an example technique for pixel blending.

FIG. 10 depicts a generalized technique (1000) for blending a current pixel with neighboring pattern pixels. Technique (1000) can be performed at step 902 of FIG. 900, for example.

At (1002), the technique includes iterating through the eight neighboring pixels of a current pixel, comparing a given neighboring pixel to the current pixel. For a given neighboring pixel of the eight neighboring pixels, the technique determines (1004) whether at least one of the following statements is true: (1) the difference of any color channel, for the given pixel compared to the current pixel, is greater than a maximum chroma deviation threshold (referred to herein as MCD_threshold); and (2) the result of ((red+blue)/2−green) for the given neighboring pixel is less than MCD_threshold. MCD_threshold can be an empirically derived threshold for the maximum chroma deviation observed in AVC 4:2:0 Remote Desktop Protocol (RDP) streams. In one example, the maximum chroma deviation threshold is 0.3.

If at least one of statements (1) and (2) is true, the given neighboring pixel is not included (1006) in the computation of the average value of the current pixel and neighboring pixels, as the given neighboring pixel is likely a foreground pixel or not the same pattern color. Otherwise, if neither statement (1) nor statement (2) is true, the given neighboring pixel is selected (1008) to be included in the computation of the average value of the current pixel and neighboring pixels.

After either step (1006) or (1008), the technique proceeds to determine (1010) whether all eight neighboring pixels have been iterated through. In particular, step (1004) is performed for each of the eight neighboring pixels, followed by either step (1006) or (1008) depending on the determination made at (1004). If the answer at (1010) is no, the technique returns to (1002).

Once a determination has been made for each of the eight neighboring pixels as to whether that neighboring pixel will be included in the computation of the average, the technique proceeds to compute (1012) the average value of the current pixel and the selected neighboring pixels. After computing the average value of the current pixel and the selected neighboring pixels, the computed average pixel value is assigned (1014) to the location of the current pixel. After step (1014), the technique ends.

FIG. 10 shows operations to determine a blended value for a single current pixel of a reconstructed screen image. In practice, the operations are repeated for the respective pixels of the video region of the reconstructed screen image.

Figure 11A:
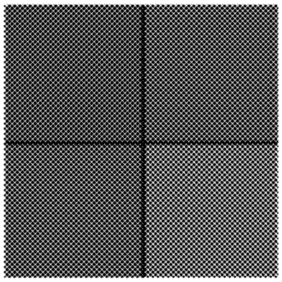
FIGS. 11A-B illustrate, respectively, an example pixel block before and after pixel blending.
Figure 11B:
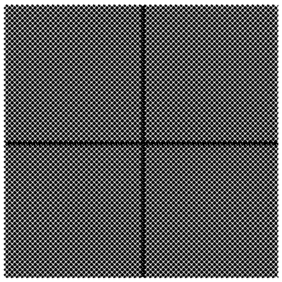

FIG. 11A depicts an example 2×2 magenta pixel block (1102) prior to current pixel blending. In this example, the transformation of the 4:2:0 YUV decoded image into a 4:4:4 RGB image has resulted in one pixel having a large difference relative to the pixel at the same location of the original image. In contrast, FIG. 11B depicts the same 2×2 magenta block after current pixel blending has been performed (e.g., in accordance with technique (1000) shown in FIG. 10). As shown in FIG. 11B, as a result of the blending, the four pixels in the pixel block appear to have identical colors (e.g., identical hue, saturation, and value (HSV) and RGB values).

ii. Pattern Color Detection.

Figure 12:
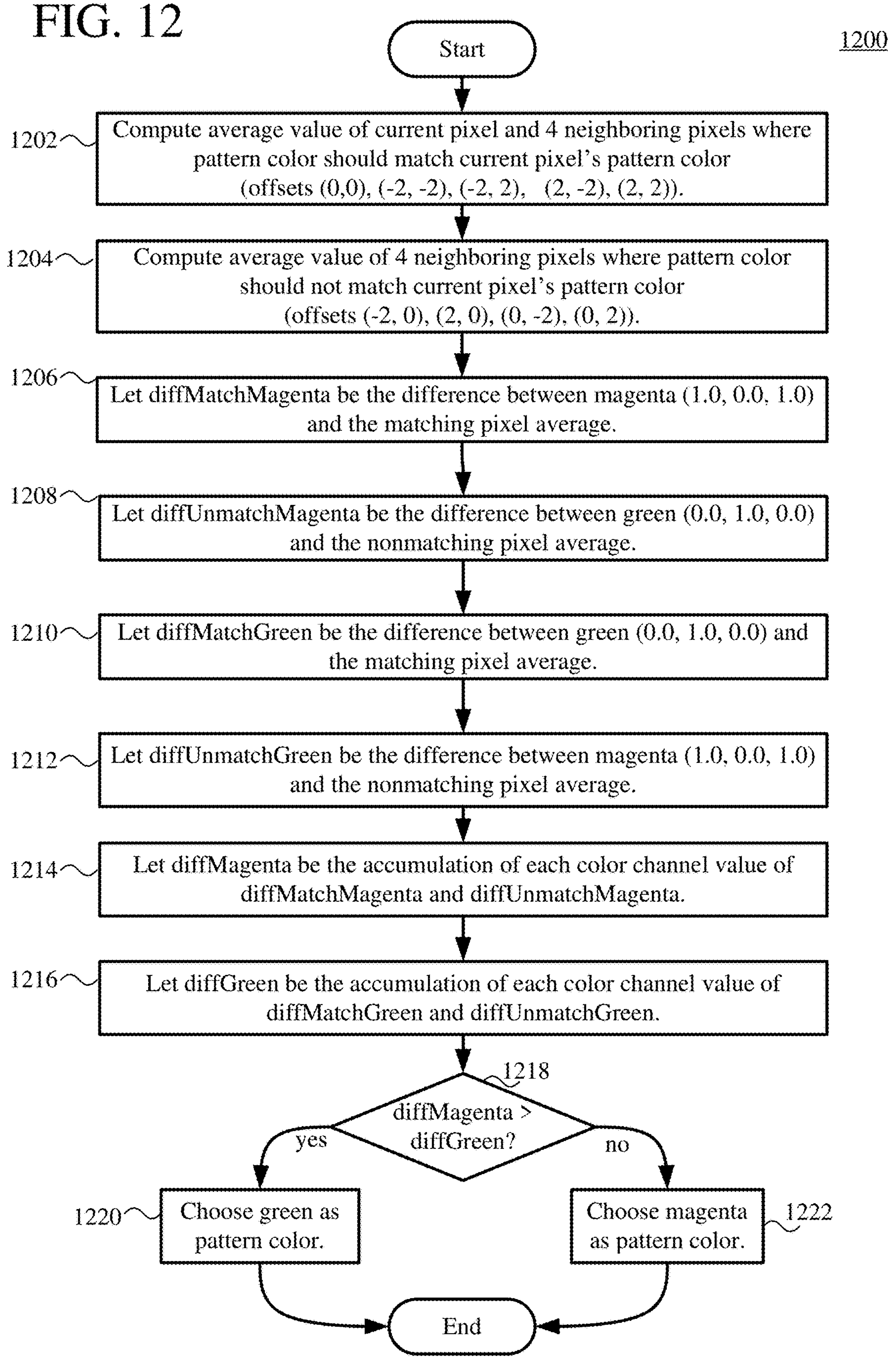
FIG. 12 is a flowchart illustrating an example technique for pattern color detection.

Misreported pattern locations can cause failure of the pattern detection algorithm. In order to avoid this problem, the disclosed technologies detect the pattern color that applies for respective pixels of the video region from the image context. An example technique (1200) for pattern color detection in which the pattern color is detected from the image context is shown in FIG. 12.

First, the average value of a current pixel and four neighboring pixels where the pattern color should match the current pixel's pattern color is computed (1202). In particular, the values of the pixels at locations with the following offsets from the location of the current pixel can be averaged: (0, 0), (−2, −2), (−2, 2), (2, −2), (2, 2). (The location (0, 0) is the current pixel.)

The average value of four neighboring pixels where the pattern color should not match the pattern color of the current pixel is then computed (1204). In particular, the values of the pixels at locations with the following offsets from the location of the current pixel can be averaged: (−2, 0), (2, 0), (0, −2), (0, 2).

Next, various parameter values are assigned. The assignment of the parameter values can occur in the order depicted, or in another order. Further, the parameter names used are only examples; other parameter names can be used without departing from the scope of this disclosure.

A parameter diffMatchMagenta is assigned (1206) a value equal to the difference between magenta (1.0, 0.0, 1.0) and the matching pixel average computed at (1202). A parameter diffUnmatchMagenta is assigned (1208) a value equal to the difference between green (0.0, 1.0, 0.0) and the nonmatching pixel average computed at (1204). A parameter diffMatchGreen is assigned (1210) a value equal to the difference between green (0.0, 1.0, 0.0) and the matching pixel average computed at (1202). A parameter diffUnmatchGreen is assigned (1212) a value equal to the difference between magenta (1.0, 0.0, 1.0) and the nonmatching pixel average computed at (1204).

Next, a parameter diffMagenta is assigned (1214) a value equal to the accumulation of each color channel value of diffMatchMagenta and diffUnmatchMagenta, and a parameter diffGreen is assigned (1216) a value equal to the accumulation of each color channel value of diffMatchGreen and diffUnmatchGreen. As used herein, the "accumulation" of a color channel value can refer to the summing or accumulation of color values for a particular channel over a period of time or across multiple frames.

The technique then determines (1218) whether diffMagenta is greater than diffGreen. If the answer is yes, green is chosen (1220) as the pattern color. Otherwise, if the answer is no, magenta is chosen (1222) as the pattern color. After step (1220) or step (1222) is performed, the technique ends.

FIG. 12 shows operations to a detect a pattern color for a single current pixel of a reconstructed screen image. In practice, the operations are repeated for the respective pixels of the video region of the reconstructed screen image.

Figure 13:
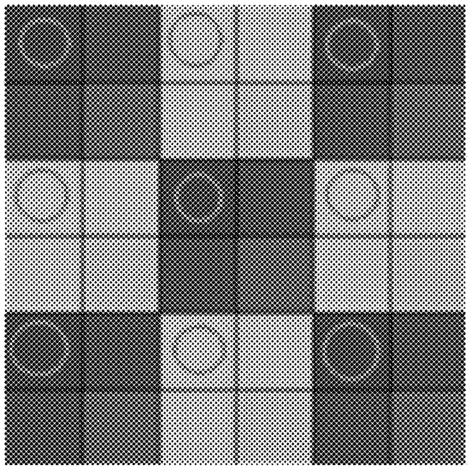
FIG. 13 illustrates an example pixel selection in a group of 2×2 pixel blocks.

FIG. 13 illustrates an example of selection of pixels for pattern detection. Towards this end, FIG. 13 depicts a group of pixel blocks with each pixel block having one of its four pixels selected. Each selected pixel is denoted by a circle within the square of the pixel. The pixels with circles include a current pixel at offset (0, 0), which is the middle circle in FIG. 13, four pixels expected to have a matching display pattern color at offsets (−2, −2), (−2, 2), (2, −2), (2, 2), respectively, and four pixels expected to have a non-matching display pattern color at offsets (−2, 0), (2, 0), (0, −2), (0, 2), respectively.

iii. Background Pixel Detection.

Figure 14:
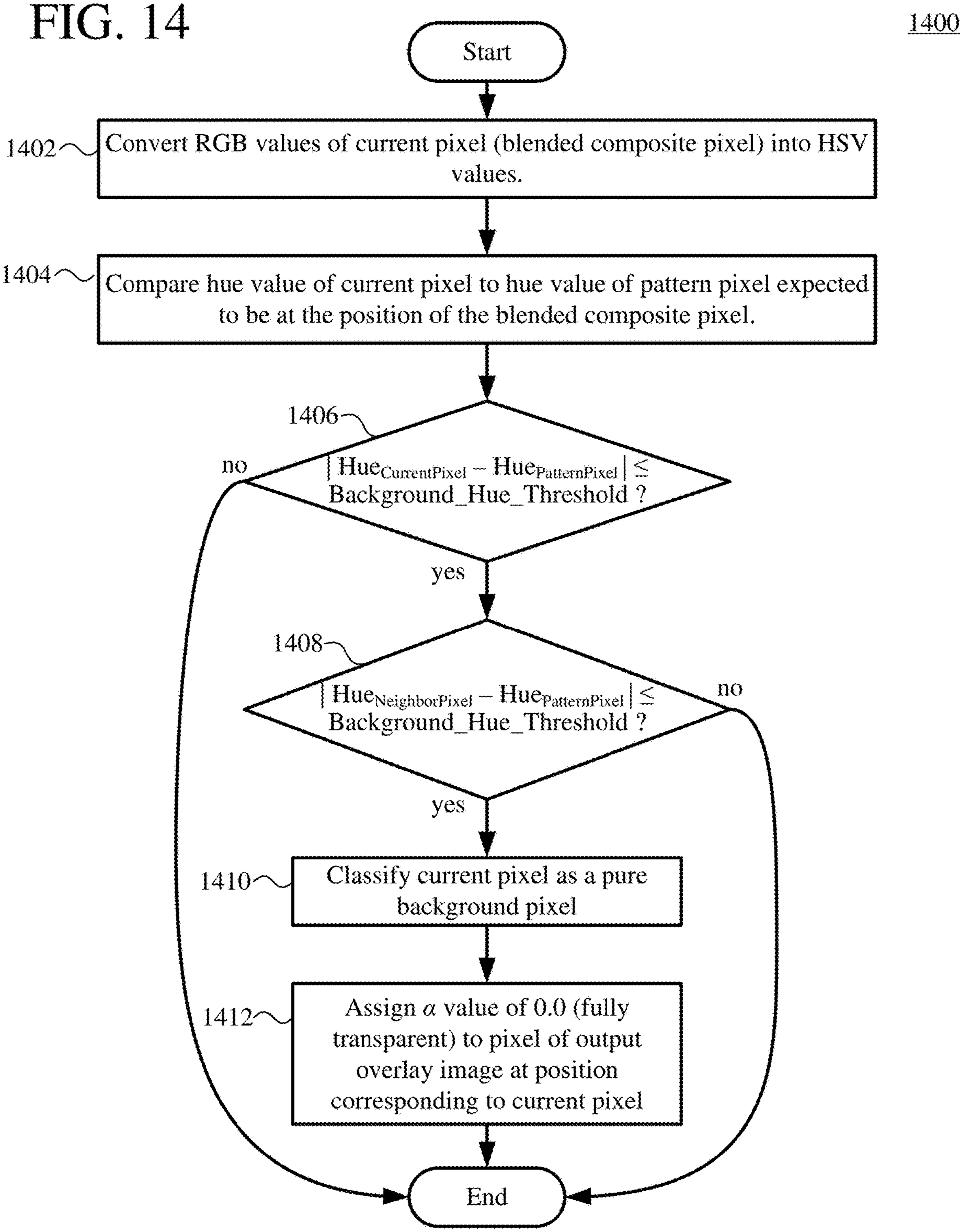
FIG. 14 is a flowchart illustrating an example technique for background pixel detection.

As noted above, one reason why a checkerboard pattern is beneficial is that it increases the likelihood that a pixel identified as a pure background pixel actually corresponds to a background, display pattern pixel (as opposed to an occluding element pixel which has the same color as the display pattern). Background pixel detection is achieved by applying a pattern color detection heuristic in which a check is performed to verify whether neighboring pixels of the current pixel also have hue values that are associated with the pattern pixels expected to be at their respective positions. An example technique 1400 for background pixel detection is shown in FIG. 14.

To detect whether a current blended composite pixel is purely a background pixel, the RGB values of the current pixel are first converted (1402) into hue, saturation, and value (HSV) values. The hue value is a single value that represents the color which the RGB values represent. The hue value for the current pixel is then compared (1404) to the hue value associated with the pattern pixel expected to be at the position of the current pixel.

The technique then proceeds to determine (1406) whether the absolute difference between the hue value of the current pixel (represented by the parameter $Hue_{CurrentPixel}$) and the hue value of the pattern pixel expected to be at the position of the current pixel (represented by the parameter $Hue_{PatternPixel}$) is less than or equal to a threshold value (represented by the parameter Background_Hue_Threshold). In an example, the parameter Background_Hue_Threshold is assigned a value of 6.0. In other examples, other values may be assigned to the Background_Hue_Threshold parameter. If the answer is "no" at the check (1406) comparing the current pixel difference value to the Background_Hue_Threshold parameter, the technique ends, and thus the current pixel is not classified as a pure background pixel.

Otherwise, if the answer is "yes" at the check (1406) comparing the current pixel difference value to the Background_Hue_Threshold parameter, the technique proceeds to determine (1408) whether the current pixel has at least one neighboring pixel for which the condition specified at (1406) is satisfied. In particular, the technique determines (1408) whether the absolute difference between the hue value of at least one of the pixels neighboring the current pixel (represented by the parameter $Hue_{NeighborPixel}$) and $Hue_{PatternPixel}$ is less than or equal to Background_Hue_Threshold. In some examples, the determination (1408) is repeated for multiple neighboring pixels of the current pixel. For example, determination (1408) may iterate through the neighboring pixels of the current pixel until a "yes" answer is obtained, or until no more neighboring pixels remain.

If the answer is "no" at the check (1408) comparing the neighbor pixel difference value(s) to the Background_Hue_Threshold parameter, the technique ends, and thus the current pixel is not classified as a pure background pixel. Otherwise, the technique proceeds to classify (1410) the current pixel as a pure background pixel, and assign (1412) an a value of 0.0, which represents a fully transparent pixel, to the pixel of the output overlay image which is at the position corresponding to the position of the current pixel. After (1412), the technique ends.

FIG. 14 shows operations to determine whether a single current pixel of a reconstructed screen image is a background pixel. In practice, the operations are repeated for the respective pixels of the video region of the reconstructed screen image.

iv. Foreground Pixel Detection.

Figure 15:
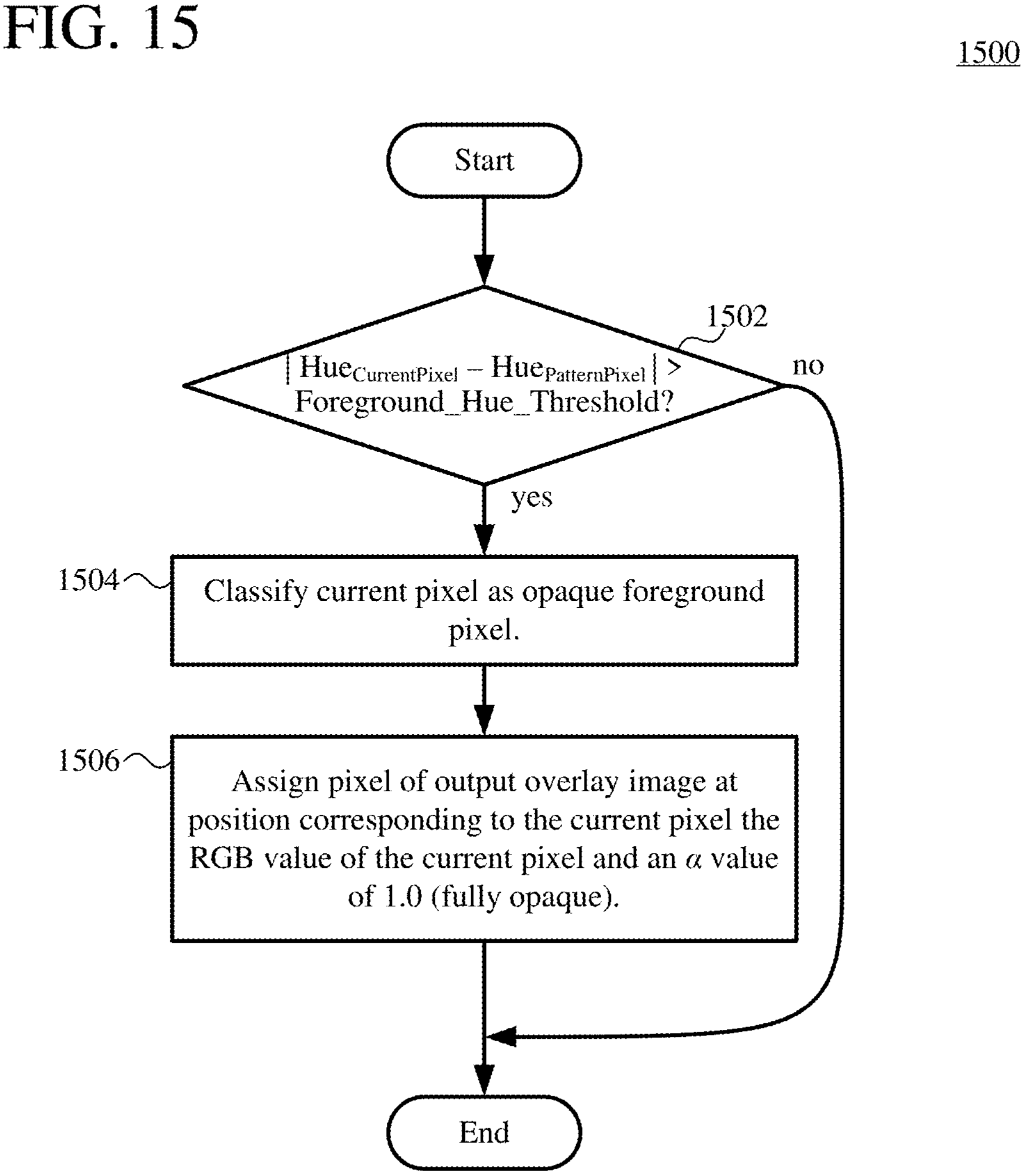
FIG. 15 is a flowchart illustrating an example technique for opaque foreground pixel detection.

If the current blended composite pixel does not meet the required criteria mentioned above to classify it as a background pixel, another heuristic can be applied to check whether the current pixel is an opaque foreground pixel (e.g., a pixel containing an occluding element without any transparency). FIG. 15 depicts a generalized technique (1500) for foreground pixel detection. Technique (1500) can be performed at step (906) of FIG. 9, for example.

At (1502), the technique includes determining whether the absolute difference between $\mathrm{Hue}_{CurrentPixel}$ and $\mathrm{Hue}_{PatternPixel}$ is greater than a threshold value (referred to as Foreground_Hue_Threshold). As an example, Foreground_Hue_Threshold can be assigned a value of 30.0. If the answer is "no" at check (1502), the technique ends, and thus the current pixel is not classified as an opaque foreground pixel.

Otherwise, if the answer is "yes" at check (1502), then the current pixel is classified (1504) as an opaque foreground pixel. Subsequently, the pixel of the output overlay image at the position corresponding to the current pixel is assigned (1506) the RGB value of the current pixel and an a value of 1.0, which represents a fully opaque pixel. After (1506), the technique ends.

FIG. 15 shows operations to determine whether a single current pixel of a reconstructed screen image is an opaque foreground pixel. In practice, the operations are repeated for the respective pixels of the video region of the reconstructed screen image other than background pixels.

v. Semi-Transparent Foreground Pixel Detection.

Figure 16:
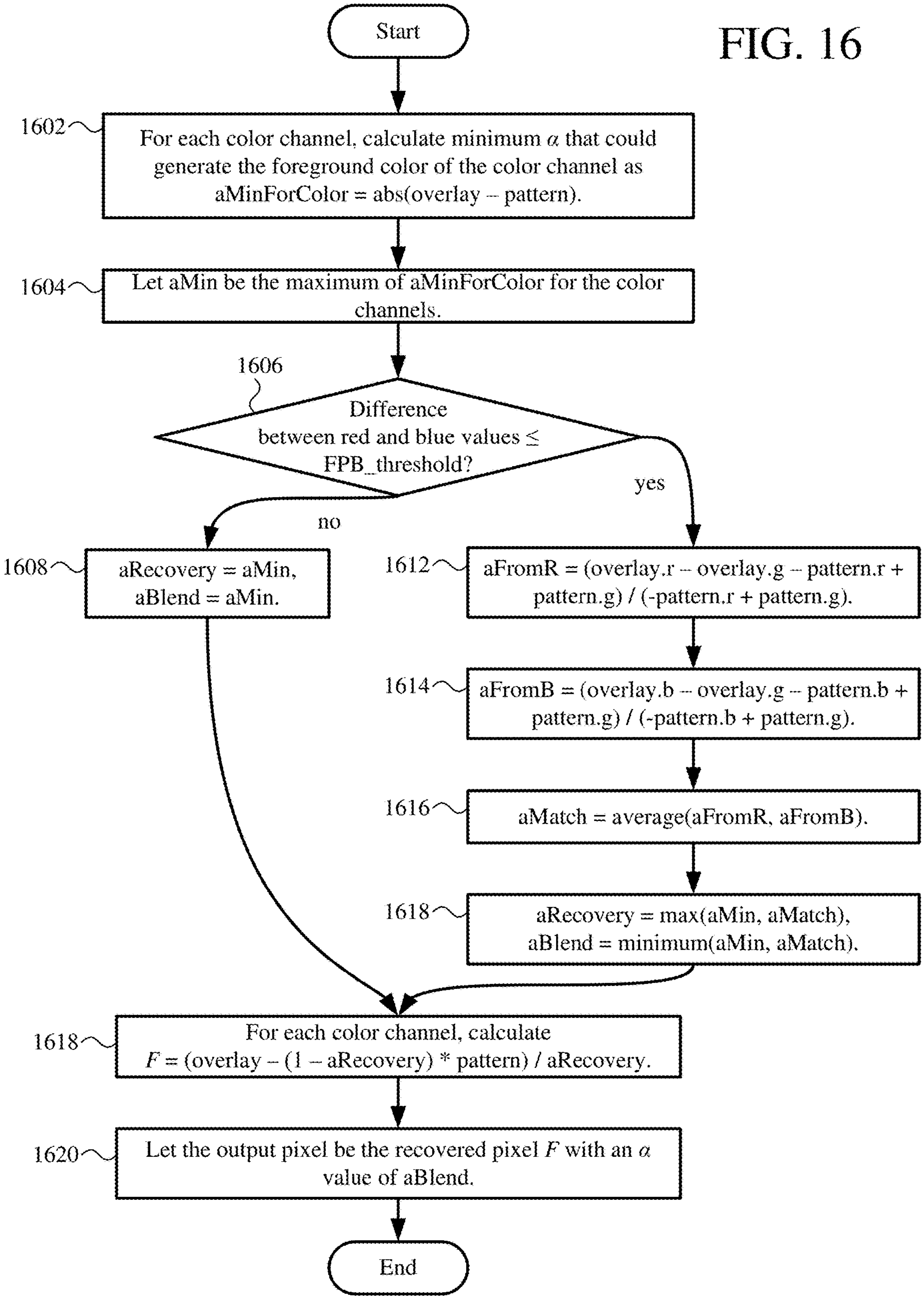
FIG. 16 is a flowchart illustrating an example technique for semi-transparent foreground pixel detection.

FIG. 16 depicts a generalized technique (1600) for detecting a semi-transparent foreground pixel. Technique (1600) can be performed at step (908) of FIG. 9, for example. Detecting semi-transparent foreground pixels can include recovering a values and foreground pixel values for pixels that are neither background pixels nor opaque foreground pixels.

First, for each color channel (e.g., for each of a red color channel, green color channel, and blue color channel), the minimum a value that could generate the foreground color of that color channel is calculated (1602) using the following equation:

$$aMinForColor = \mathrm{abs}(\mathrm{overlay} - \mathrm{pattern})$$

The parameter overlay represents the color value in the R, G, or B color channel for the current blended composite pixel, and the parameter pattern represents the value in the same color channel for the pattern pixel expected to be at the position of the current pixel. For example, parameters aMinforR, aMinforG, and aMinforB are determined for the R, G, and B color channels, respectively. Next, the parameter aMin is assigned (1604) to be the maximum of the aMinForColor values for the color channels, respectively. For example, the parameter aMin is assigned to be the maximum of aMinforR, aMinforG, and aMinforB for the current pixel.

The technique then determines (1606) whether the difference between the red and blue values for the current pixel is less than or equal to a foreground pixel blending threshold (referred to as FPB_threshold). The difference between the red and blue values for the current pixel indicates whether or not the current pixel is a "low chroma" pixel. If the difference between the red and blue values is less than the FPB_threshold, the current pixel is a low chroma pixel. In one example, FPB_threshold is set as 0.2. If the answer is "no" at check (1606), the technique proceeds to assign (1608) the value of aMin determined at (1604) to each of a parameter aRecovery and a parameter aBlend.

Otherwise, if the answer is "yes" at check (1606), the technique proceeds to assign (1612)-(1618) values to several parameters. First, aFromR is assigned (1612) as follows:

$$aFromR = (overlay.r - overlay.g - pattern.r + pattern.g)/(-pattern.r + pattern.g).$$

The parameters overlay.r and overlay.g indicate the red and green color channel values, respectively, for the current pixel. The parameters pattern.r and pattern.g indicate the red and green color channel values, respectively, for the pattern pixel. Next, aFromB is assigned (1614) as follows:

$$aFromB = (overlay.b - overlay.g - pattern.b + pattern.g)/(-pattern.b + pattern.g).$$

The parameters overlay.b and overlay.g indicate the blue and green color channel values, respectively, for the current pixel. The parameters pattern.b and pattern.g indicate the blue and green color channel values, respectively, for the pattern pixel. Subsequently, aMatch is assigned (1616) a value equal to the average of aFromR and aFromB, aRecovery is assigned (1614) a value equal to the maximum of aMin and aMatch, and aBlend is assigned (1614) a value equal to the minimum of aMin and aMatch.

After (1618), as well as after (1608), the technique proceeds to calculate (1620) the foreground occluding element pixel value (F) for each color channel as follows:

$$F = (\mathrm{overlay} - (1 - aRecovery) * \mathrm{pattern})/aRecovery.$$

The parameter overlay represents the color value in the R, G, or B color channel for the current pixel, and the parameter pattern represents the value in the same color channel for the pattern pixel expected to be at the position of the current pixel. Finally, the output pixel is set (1620) as the recovered pixel F with an a value of aBlend. After (1620), the technique ends.

FIG. 16 shows operations to determine a pixel value and a value for a single current pixel of a reconstructed screen image. In practice, the operations are repeated for the respective pixels of the video region of the reconstructed screen image other than background pixels and opaque foreground pixels.

FIG. 17A-E illustrate intermediate and final results achieved by the techniques disclosed herein, including technique (1600) for foreground pixel blending.

Figure 17A:
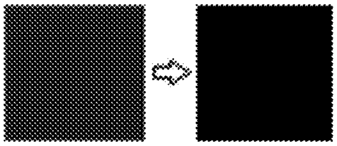
FIGS. 17A-C illustrate examples of overlays on pattern pixels.

In particular, FIG. 17A illustrates a black (0.0, 0.0, 0.0) overlay on a magenta pattern (1.0, 0.0, 1.0), with an a value of 0.5. In this example, the starting value of the current pixel of the reconstructed screen image is (0.5, 0.0, 0.5), which is 0.5×(1.0, 0.0, 1.0)+0.5×(0.0, 0.0, 0.0). From the starting value (0.5, 0.0, 0.5), the parameters aMinforR, aMinforG, and aMinforB are assigned values equal to 0.5, 0.0, and 0.5, respectively. The parameter aMin is assigned a value of 0.5. Because the current pixel is determined to be a "low chroma" pixel based on the difference between the red and blue values, the parameter afromR is assigned a value of (0.5−0.0−1.0+0.0)/(−1.0+0.0)=0.5, and the parameter afromB is assigned a value of (0.5−0.0−1.0+0.0)/(−1.0+0.0)=0.5. From these values, the parameters aMatch, aRecovery, and aBlend are assigned values of 0.5, 0.5, and 0.5, respectively. The red, green, and blue values are assigned values:

$$F.r = (0.5 - (0.5 \times 1.0))/0.5 - 0.0,$$

$$F.g = (0.0 - (0.5 \times 0.0))/0.5 - 0.0,$$

$$F.b = (0.5 - (0.5 \times 1.0))/0.5 - 0.0,$$

which provides the value of the overlay (0.0, 0.0, 0.0). Finally, the a value is set to 0.5.

Figure 17B:
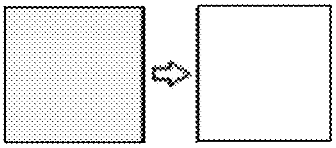

FIG. 17B illustrates a white (1.0, 1.0, 1.0) overlay on a green pattern (0.0, 1.0, 0.0), with an α value of 0.77. A black outline is illustrated around the white overlay to ensure legibility of the figure; this outline would not actually be present on the white overlay. In this example, the starting value of the current pixel of the reconstructed screen image is (0.77, 1.0, 0.77), which is 0.77×(1.0, 1.0, 1.0)+0.23×(0.0, 1.0, 0.0). From the starting value (0.77, 1.0, 0.77), the parameters aMinforR, aMinforG, and aMinforB are assigned values equal to 0.77, 0.0, and 0.77, respectively. The parameter aMin is assigned α value of 0.77. Because the current pixel is determined to be a "low chroma" pixel based on the difference between the red and blue values, the parameter afromR is assigned α value of (0.77−1.0−0.0+1.0)/(0.0+1.0)=0.77, and the parameter afromB is assigned α value of (0.77−1.0−0.0+1.0)/(0.0+1.0)=0.77. From these values, the parameters aMatch, aRecovery, and aBlend are assigned values of 0.77, 0.77, and 0.77, respectively. The red, green, and blue values are assigned values:

$$F.r = (0.77 - (0.23 \times 0.0))/0.77 = 1.0,$$

$$F.g = (1.0 - (0.23 \times 1.0))/0.77 = 1.0,$$

$$F.b = (0.77 - (0.23 \times 0.0))/0.77 = 1.0,$$

which provides the value of the overlay (1.0, 1.0, 1.0). Finally, the α value is set to 0.77.

Figure 17C:
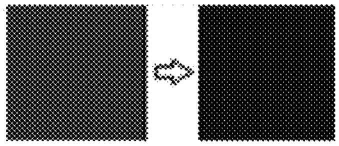

FIG. 17C illustrates a blue (0.0, 0.0, 1.0) overlay on a green pattern (0.0, 1.0, 0.0), with an α value of 0.8. In this example, the starting value of the current pixel of the reconstructed screen image is (0.0, 0.2, 0.8), which is 0.8×(0.0, 0.0, 1.0)+0.2×(0.0, 1.0, 0.0). From the starting value (0.0, 0.2, 0.8), the parameters aMinforR, aMinforG, and aMinforB are assigned values equal to 0.0, 0.8, and 0.8, respectively. The parameter aMin is assigned α value of 0.8. Because the current pixel is not determined to be a "low chroma" pixel based on the difference between the red and blue values, values for the parameters afromR, afromB, and aMatch are not determined. Instead, the parameters aRecovery and aBlend are assigned values of 0.8 and 0.8, respectively. The red, green, and blue values are assigned values:

$$F.r = (0.0 - (0.2 \times 0.0))/0.8 = 0.0,$$

$$F.g = (0.2 - (0.2 \times 1.0))/0.8 = 0.0,$$

$$F.b = (0.8 - (0.2 \times 0.0))/0.8 = 1.0,$$

which provides the value of the overlay (0.0, 0.0, 1.0). Finally, the α value is set to 0.8.

For other values of semi-transparent foreground pixels, color values and a values for the overlay can be similarly determined.

Figure 17D:
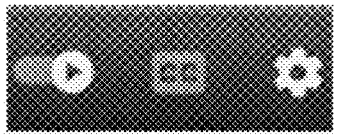
FIG. 17D illustrates an example of semi-transparent video controls over a pattern.
Figure 17E:
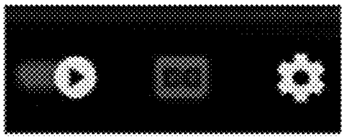
FIG. 17E illustrates an example of recovered video controls blended with video.

FIG. 17D illustrates an example of semi-transparent occluding elements (specifically, video controls) overlaid on a green and magenta checkerboard pattern. A modified web page generated by a server-side MMR browser extension, such as modified web page (222), can include semi-transparent video controls displayed over a pattern in this manner. In contrast, FIG. 17E illustrates an example of the same occluding elements after they have been recovered via the techniques disclosed herein. In particular, the pattern has been removed and the video controls have been blended with the underlying video stream.

V. EXAMPLE COMPUTER SYSTEMS

Figure 18:
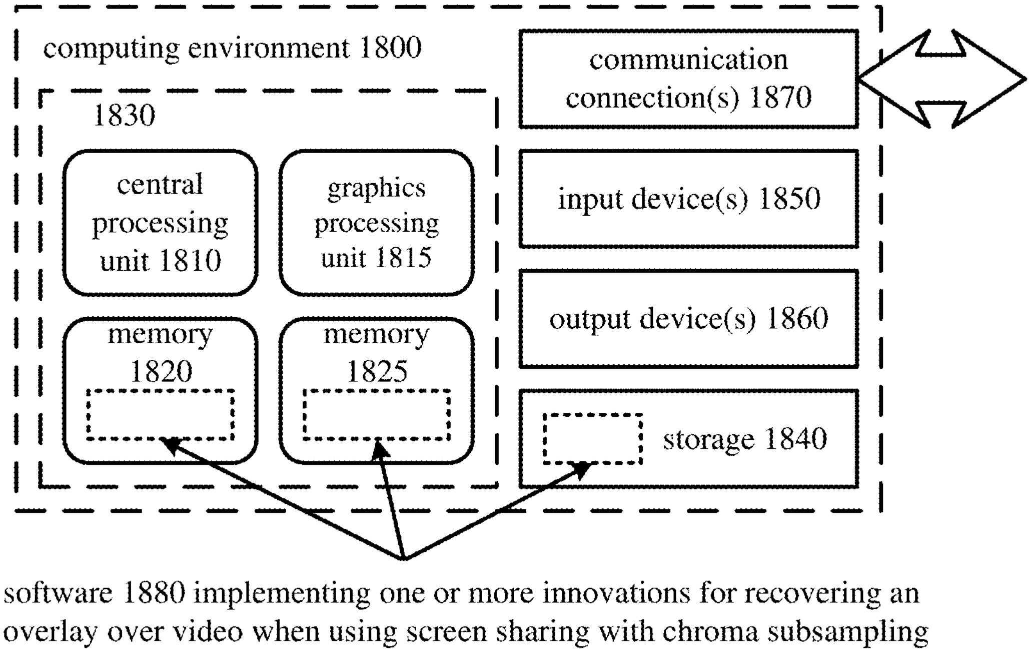
FIG. 18 is a diagram illustrating an example computing system in which some described embodiments can be implemented.

FIG. 18 illustrates a generalized example of a suitable computer system (1800) in which several of the described innovations may be implemented. The computer system (1800) is not intended to suggest any limitation as to scope of use or functionality, as the innovations may be implemented in diverse general-purpose or special-purpose computer systems.

With reference to FIG. 18, the computer system (1800) includes a processing system comprising one or more processing units (1810, 1815) and memory (1820, 1825). The processing units (1810, 1815) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 18 shows a CPU (1810) as well as a graphics processing unit ("GPU") (1815). In general, the GPU (1815) is any specialized circuit, different from the CPU (1810), that accelerates creation and/or manipulation of image data in a graphics pipeline. The GPU (1815) can be implemented as part of a dedicated graphics card (video card), as part of a motherboard, as part of a system on a chip ("SoC"), or in some other way (even on the same die as the CPU (1810)).

The tangible memory (1820, 1825) may be volatile memory (e.g., registers, cache, RAM), non-volatile memory (e.g., ROM, EEPROM, flash memory), or some combination of the two, accessible by the processing unit(s). In FIG. 18, the memory (1820) is CPU memory, accessible to the CPU (1810), and the memory (1825) is GPU memory, accessible to the GPU (115). Depending on architecture (e.g., whether the GPU (1815) is part of a video card, motherboard, or SoC), the CPU memory can be completely separate from the GPU memory, or the CPU memory and GPU memory can, at least in part, be shared memory or drawn from the same source (e.g., RAM). The memory (1820, 1825) stores software (1880) implementing one or more innovations for recovering an overlay over video when using screen sharing with chroma subsampling, in the form of computer-executable instructions suitable for execution by the processing unit(s).

A computer system may have additional features. For example, the computer system (1800) includes storage (1840), one or more input devices (1850), one or more output devices (1860), and one or more communication connections (1870). An interconnection mechanism (not shown) such as a bus, controller, or network interconnects the components of the computer system (1800). Typically, operating system ("OS") software (not shown) provides an operating environment for other software executing in the computer system (1800), and coordinates activities of the components of the computer system (1800).

The tangible storage (1840) may be removable or non-removable, and includes magnetic storage media such as magnetic disks, magnetic tapes or cassettes, optical storage media such as CD-ROMs or DVDs, or any other medium which can be used to store information and which can be accessed within the computer system (1800). The storage (1840) can store instructions for the software (1880) implementing one or more innovations for recovering an overlay over video when using screen sharing with chroma subsampling.

The input device(s) (1850) may be a touch input device such as a keyboard, mouse, pen, or trackball, a voice input device, a scanning device, or another device that provides input to the computer system (1800). For video, the input device(s) (1850) may be a camera, video card, screen capture module, TV tuner card, or similar device that accepts video input in analog or digital form, or a CD-ROM or CD-RW that reads video input into the computer system (1800). The output device(s) (1860) may be a display, printer, speaker, CD-writer, or another device that provides output from the computer system (1800).

The communication connection(s) (1870) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, communication media can use an electrical, optical, RF, or other carrier.

The innovations can be described in the general context of computer-readable media. Computer-readable media are any available tangible media that can be accessed within a computing environment. By way of example, with the computer system (1800), computer-readable media include memory (1820, 1825), storage (1840), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "perform" to describe computer operations in a computer system. These terms are high-level abstractions for operations performed by a computer, and should not be confused with acts performed by a human being. The actual computer operations corresponding to these terms vary depending on implementation.

VI. EXAMPLES

The innovative features described herein include the following examples.

| | Example |
|---|---|
| A1 | In a computer system, a method of recovering and applying an overlay over video while using a screen remoting application with chroma subsampling, the method comprising:<br>receiving encoded data for a screen image from a server hosting the screen remoting application;<br>reconstructing the screen image, including decoding the encoded data for the screen image and performing chroma upsampling operations on the screen image, the screen image comprising an overlay drawn over a display pattern in a video region, the overlay comprising an element that at least partially occludes the display pattern for pixels of the video region;<br>generating an output overlay image by processing the screen image, the processing comprising:<br>selectively blending a first group of the pixels of the video region with neighboring pixels;<br>assigning display pattern colors to a second group of the pixels of the video region, respectively, based on color bias;<br>detecting background pixels among the pixels of the video region;<br>detecting opaque foreground pixels among the pixels of the video region; and<br>detecting semi-transparent foreground pixels among the pixels of the video region; and<br>rendering the output overlay image on top of video in the video region. |
| A2 | The method of A1, wherein selectively blending the first group of the pixels of the video region with neighboring pixels comprises, for each of a plurality of neighboring pixels around a current pixel, determining whether to include a respective neighboring pixel of the plurality of neighboring pixels in a computation of an average pixel value for the current pixel based on color channel differences between the respective neighboring pixel and the current pixel compared to a maximum chroma deviation threshold. |
| A3 | The method of A2, wherein determining whether to include the respective neighboring pixel in the computation of the average neighboring pixel value for the current pixel based on the color channel differences between the respective neighboring pixel and the current pixel compared to the maximum chroma deviation threshold comprises: |

-continued

| Example | |
|---|---|
| | determining whether at least one of a red color channel difference, a green color channel difference, and a blue color channel difference between the respective neighboring pixel and the current pixel exceeds the maximum chroma deviation threshold; and determining whether a result of a sum of the red and blue color channel differences between the respective neighboring pixel and the current pixel, divided by two, minus the green color channel difference between the respective neighboring pixel and the current pixel is less than the maximum chroma deviation threshold. |
| A4 | The method of A3, further comprising: responsive to at least one of: a determination that at least one of the red, green, and blue color channel differences between the respective neighboring pixel and the current pixel exceeds the maximum chroma deviation threshold; and a determination that the result of the sum of the red and blue color channel differences between the respective neighboring pixel and the current pixel, divided by two, minus the green channel difference between the respective neighboring pixel and the current pixel, is less than the maximum chroma deviation threshold, not including the respective neighboring pixel in the computation of the average pixel value for the current pixel. |
| A5 | The method of A3, further comprising: responsive to neither of: a determination that at least one of the red, green, and blue color channel differences between the respective neighboring pixel and the current pixel exceeds the maximum chroma deviation threshold; and a determination that the result of the sum of the red and blue color channel differences between the respective neighboring pixel and the current pixel, divided by two, minus the green channel difference between the respective neighboring pixel and the current pixel, is less than the maximum chroma deviation threshold, selecting the respective neighboring pixel to be included in the computation of the average pixel value for the current pixel. |
| A6 | The method of A5, further comprising: computing the average of the current pixel and any selected neighboring pixels; and assigning the computed average pixel value to a location of the current pixel in the overlay. |
| A7 | The method of any one of A1-A6, wherein assigning the display pattern colors to the second group of the pixels of the video region based on color bias comprises, for a current pixel having a display pattern color: computing a first average value of the current pixel and a plurality of neighboring pixels of the current pixel whose display pattern color is expected to match the display pattern color of the current pixel; and computing a second average value of a plurality of neighboring pixels of the current pixel whose display pattern color is not expected to match the display pattern color of the current pixel. |
| A8 | The method of A7, wherein the display pattern comprises alternating 2 × 2 pixel blocks of contrasting colors in a checkerboard pattern. |
| A9 | The method of A8, wherein the contrasting colors are green and magenta, the method further comprising: determining a first difference between a magenta color channel value and the first average value; determining a second difference between a green color channel value and the second average value; determining a third difference between the green color channel value and the first average value; determining a fourth difference between the magenta color channel value and the second average value; determining a first accumulation value by adding each color channel value of the first difference and the fourth difference; and determining a second accumulation value by adding each color channel value of the second difference and the third difference. |
| A10 | The method of A9, further comprising: responsive to a determination that the first accumulation value is greater than the second accumulation value, assigning green as the display pattern color for the selected pixel. |
| A11 | The method of A9, further comprising: responsive to a determination that the first accumulation value is not greater than the second accumulation value, assigning magenta as the display pattern color for the selected pixel. |
| A12 | The method of any one of A1-A11, wherein detecting background pixels of the video region comprises, for a current pixel: converting red, green, blue (RGB) values of the current pixel into hue, saturation, and value (HSV) values; and comparing a hue value of the current pixel to a hue value of a pattern pixel expected to be at a position of the current pixel in the video region. |
| A13 | The method of A12, further comprising: responsive to a determination that an absolute difference between the hue value of the current pixel and the hue value of the pattern pixel expected to be at the position of the current pixel is less than or equal to a background hue threshold value and a determination that an absolute difference between a hue value of a neighboring |

-continued

| | Example |
|---|---|
| | pixel of the current pixel and a hue value of a pattern pixel expected to be at the position of the neighboring pixel is less than or equal to the background hue threshold value, classifying the current pixel as a background pixel. |
| A14 | The method of A12, further comprising, for each pixel classified as a background pixel, assigning an α value of 0.0 to a pixel at a corresponding location of the output overlay image such that the pixel at the corresponding location of the output overlay image is fully transparent. |
| A15 | The method of any one of A1-A11, wherein detecting opaque foreground pixels of the video region comprises, for a current pixel:<br>converting red, green, blue (RGB) values of the current pixel into hue, saturation, and value (HSV) values;<br>comparing a hue value of the current pixel to a hue value of a pattern pixel expected to be at a position of the current pixel in the video region; and<br>responsive to a determination that an absolute difference between the hue value of the current pixel and the hue value of the pattern pixel expected to be at the position of the current pixel is greater than a foreground hue threshold value, classifying the current pixel as an opaque foreground pixel. |
| A16 | The method of A15, further comprising, for each pixel classified as an opaque foreground pixel, assigning the RGB value of the classified foreground pixel and an α value of 1.0 to a pixel at a corresponding location of the output overlay image, such that the pixel at the corresponding location of the output overlay image is fully opaque and the same color as the classified foreground pixel. |
| A17 | The method of any one of A1-A16, wherein detecting semi-transparent foreground pixels of the video region comprises, for a current pixel:<br>for each of a red color channel, a green color channel, and a blue color channel of the current pixel, calculating a minimum α value that could generate the foreground color of the color channel. |
| A18 | The method of A17, further comprising:<br>responsive to a determination that a difference between values of the red and blue color channels for the current pixel is less than or equal to a threshold value, calculating an α value for the current pixel based at least in part on an assumption that a pixel at a corresponding location of the output overlay image has no chroma. |
| A19 | The method of A17, further comprising:<br>calculating a foreground occluding element pixel value for each of the red, green, and blue color channels of the current pixel; and<br>assigning the calculated α value and the foreground occluding element pixel value to a pixel at a corresponding location of the output overlay image. |
| A20 | The method of any one of A1-A19, wherein the rendering of the output overlay image on top of the video is performed by:<br>a multimedia redirection (MMR) plugin installed on a client computing device; or<br>a screen remoting application installed on the client computing device. |
| B1 | In a computer system, a method of processing an overlay over a video region to generate a screen image, the method comprising:<br>constructing a screen image that includes a video region;<br>drawing a display pattern of alternating 2 × 2 pixel blocks of contrasting colors in the video region;<br>drawing an overlay in the video region, the overlay comprising an element that at least partially occludes the display pattern;<br>encoding the screen image, thereby producing encoded data for the screen image, wherein the encoding the screen image is preceded by chroma subsampling; and<br>sending encoded data for the video and the encoded data for the screen image to a client computing device. |
| B2 | The method of B1, wherein the screen image also includes elements of a web page. |
| B3 | The method of B1 or B2, wherein the display pattern of alternating 2 × 2 pixels blocks of contrasting colors is a checkerboard pattern. |
| B4 | The method of any one of B1-B3, wherein the contrasting colors are green and magenta. |
| B5 | The method of any one of B1-B4, wherein encoding the screen image comprises encoding the screen image in an Advanced Video Coding (AVC) 4:2:0 mode. |
| B6 | The method of B1, wherein the drawing of the display pattern of alternating 2 × 2 pixel blocks in the video region is performed by:<br>a multimedia redirection (MMR) browser extension executing on a virtual machine hosted by a server system; or<br>a screen remoting service executing on the virtual machine hosted by the server system or executing on the server system. |
| B7 | The method of any one of B1-B6, wherein the element that at least partially occludes the display pattern comprises a semi-transparent video control element or a semi-transparent filter. |

-continued

| Example | |
|---|---|
| C1 | In a computer system, a method of recovering and applying an overlay over video while using a screen remoting application with chroma subsampling, the method comprising: at a server system hosting a screen remoting application: constructing a screen image that includes a video region; drawing a display pattern of alternating 2 × 2 pixel blocks of contrasting colors in the video region; drawing an overlay comprising an element that at least partially occludes the display pattern; encoding the screen image, thereby producing encoded data for the screen image, wherein the encoding the screen image is preceded by chroma subsampling; and sending encoded data for the screen image to a client computing device; and at a client computing device: receiving the encoded data for the screen image from the server system; reconstructing the screen image, including decoding the encoded data for the screen image and performing chroma upsampling operations on the screen image, the screen image comprising the overlay drawn over the display pattern; generating an output overlay image by processing the screen image; and rendering the output overlay image on top of video in the video region. |
| C2 | The method of C1, wherein generating the output overlay image by processing the screen image at the client computing device comprises: selectively blending a first group pixels of the video region with neighboring pixels; assigning display pattern colors to a second group of the pixels of the video region, respectively, based on color bias; detecting background pixels of the video region; detecting opaque foreground pixels of the video region; and detecting semi-transparent foreground pixels of the video region. |
| ABC1 | One or more computer-readable media storing computer-executable instructions for causing a computer system, when programmed thereby, to perform operations for the method of any one of A1-A20, B1-B7, and C1-C2. |
| ABC2 | A computer system comprising a processing system and memory, wherein the computer system implements an occlusion renderer configured to perform operations for the method of any one of A1-A20, B1-B7, and C1-C2. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method of recovering and applying an overlay over video while using a screen remoting application with chroma subsampling, the method comprising:

receiving encoded data for a screen image from a server hosting the screen remoting application;

reconstructing the screen image, including decoding the encoded data for the screen image and performing chroma upsampling operations on the screen image, the screen image comprising an overlay drawn over a display pattern in a video region, the overlay comprising an element that at least partially occludes the display pattern for pixels of the video region;

generating an output overlay image by processing the screen image, the processing comprising:

selectively blending a first group of the pixels of the video region with neighboring pixels;

assigning display pattern colors to a second group of the pixels of the video region, respectively, based on color bias;

detecting background pixels among the pixels of the video region;

detecting opaque foreground pixels among the pixels of the video region; and detecting semi-transparent foreground pixels among the pixels of the video region; and rendering the output overlay image on top of video in the video region.

2. The method of claim 1, wherein selectively blending the first group of the pixels of the video region with neighboring pixels comprises, for each of a plurality of neighboring pixels around a current pixel, determining whether to include a respective neighboring pixel of the plurality of neighboring pixels in a computation of an average pixel value for the current pixel based on color channel differences between the respective neighboring pixel and the current pixel compared to a maximum chroma deviation threshold.

3. The method of claim 2, wherein determining whether to include the respective neighboring pixel in the computation of the average pixel value for the current pixel based on the color channel differences between the respective neighboring pixel and the current pixel compared to the maximum chroma deviation threshold comprises:

determining whether at least one of a red color channel difference, a green color channel difference, and a blue color channel difference between the respective neighboring pixel and the current pixel exceeds the maximum chroma deviation threshold; and determining whether a result of a sum of the red and blue color channel differences between the respective neighboring pixel and the current pixel, divided by two, minus the green color channel difference between the respective neighboring pixel and the current pixel is less than the maximum chroma deviation threshold.

4. The method of claim 3, further comprising:

responsive to at least one of: a determination that at least one of the red, green, and blue color channel differences between the respective neighboring pixel and the current pixel exceeds the maximum chroma deviation threshold; and a determination that the result of the sum of the red and blue color channel differences between the respective neighboring pixel and the current pixel, divided by two, minus the green color channel difference between the respective neighboring pixel and the current pixel, is less than the maximum chroma deviation threshold, not including the respective neighboring pixel in the computation of the average pixel value for the current pixel.

5. The method of claim 3, further comprising:

responsive to neither of: a determination that at least one of the red, green, and blue color channel differences between the respective neighboring pixel and the current pixel exceeds the maximum chroma deviation threshold; and a determination that the result of the sum of the red and blue color channel differences between the respective neighboring pixel and the current pixel, divided by two, minus the green color channel difference between the respective neighboring pixel and the current pixel, is less than the maximum chroma deviation threshold, selecting the respective neighboring pixel to be included in the computation of the average pixel value for the current pixel, computing the average of the current pixel and any selected neighboring pixels, and assigning the computed average pixel value to a location of the current pixel in the overlay.

6. The method of claim 1, wherein assigning the display pattern colors to the second group of the pixels of the video region based on color bias comprises, for a current pixel having a display pattern color:

computing a first average value of the current pixel and a plurality of neighboring pixels of the current pixel whose display pattern color is expected to match the display pattern color of the current pixel; and computing a second average value of a plurality of neighboring pixels of the current pixel whose display pattern color is not expected to match the display pattern color of the current pixel.

7. The method of claim 6, wherein the display pattern comprises alternating 2×2 pixel blocks of contrasting colors in a checkerboard pattern.

8. The method of claim 7, wherein the contrasting colors are green and magenta, the method further comprising:

determining a first difference between a magenta color channel value and the first average value;

determining a second difference between a green color channel value and the second average value;

determining a third difference between the green color channel value and the first average value;

determining a fourth difference between the magenta color channel value and the second average value;

determining a first accumulation value by adding each color channel value of the first difference and the fourth difference; and determining a second accumulation value by adding each color channel value of the second difference and the third difference.

9. The method of claim 8, further comprising:

responsive to a determination that the first accumulation value is greater than the second accumulation value, assigning green as the display pattern color for the current pixel.

10. The method of claim 8, further comprising:

responsive to a determination that the first accumulation value is not greater than the second accumulation value, assigning magenta as the display pattern color for the current pixel.

11. The method of claim 1, wherein detecting background pixels among the pixels of the video region comprises, for a current pixel:

converting red, green, blue (RGB) values of the current pixel into hue, saturation, and value (HSV) values;

comparing a hue value of the current pixel to a hue value of a pattern pixel expected to be at a position of the current pixel in the video region;

responsive to a determination that an absolute difference between the hue value of the current pixel and the hue value of the pattern pixel expected to be at the position of the current pixel is less than or equal to a background hue threshold value and a determination that an absolute difference between a hue value of a neighboring pixel of the current pixel and a hue value of a pattern pixel expected to be at a position of the neighboring pixel is less than or equal to the background hue threshold value, classifying the current pixel as a background pixel.

12. The method of claim 1, wherein detecting opaque foreground pixels among the pixels of the video region comprises, for a current pixel:

converting red, green, blue (RGB) values of the current pixel into hue, saturation, and value (HSV) values;

comparing a hue value of the current pixel to a hue value of a pattern pixel expected to be at a position of the current pixel in the video region;

responsive to a determination that an absolute difference between the hue value of the current pixel and the hue value of the pattern pixel expected to be at the position of the current pixel is greater than a foreground hue threshold value, classifying the current pixel as an opaque foreground pixel.

13. The method of claim 1, wherein detecting semi-transparent foreground pixels among the pixels of the video region comprises, for a current pixel:

for each of a red color channel, a green color channel, and a blue color channel of the current pixel, calculating a minimum $\alpha$ value that could generate a foreground color of the color channel;

responsive to a determination that a difference between values of the red and blue color channels for the current pixel is less than or equal to a threshold value, calculating an $\alpha$ value for the current pixel based at least in part on an assumption that a pixel at a corresponding location of the output overlay image has no chroma;

calculating a foreground occluding element pixel value for each of the red, green, and blue color channels of the current pixel; and assigning the calculated $\alpha$ value and the foreground occluding element pixel value to the pixel at the corresponding location of the output overlay image.

14. In a computer system, a method of processing an overlay over a video region to generate a screen image, the method comprising:

constructing a screen image that includes a video region;

drawing a display pattern of alternating 2×2 pixel blocks of contrasting colors in the video region;

drawing an overlay in the video region, the overlay comprising an element that at least partially occludes the display pattern;

encoding the screen image, thereby producing encoded data for the screen image, wherein the encoding the screen image is preceded by chroma subsampling; and sending encoded data for a video and the encoded data for the screen image to a client computing device for reconstruction of the screen image, generation of an output overlay image by processing the screen image, and rendering of the output overlay image on top of the video in the video region, wherein the reconstruction of the screen image comprises decoding the encoded data for the screen image and performing chroma upsampling operations on the screen image, the screen image comprising the overlay drawn over the display pattern.

15. The method of claim 14, wherein the display pattern of alternating 2×2 pixel blocks of contrasting colors is a checkerboard pattern.

16. The method of claim 14, wherein encoding the screen image comprises encoding the screen image in an Advanced Video Coding (AVC) 4:2:0 mode.

17. The method of claim 14, wherein the drawing of the display pattern of alternating 2×2 pixel blocks in the video region is performed by:

a multimedia redirection (MMR) browser extension executing on a virtual machine hosted by a server system; or a screen remoting service executing on the virtual machine hosted by the server system or executing on the server system.

18. The method of claim 14, wherein the element that at least partially occludes the display pattern comprises a semi-transparent video control element or a semi-transparent filter.

19. In a computer system, a method of recovering and applying an overlay over video while using a screen remoting application with chroma subsampling, the method comprising:

at a server system hosting a screen remoting application:

constructing a screen image that includes a video region;

drawing a display pattern of alternating 2×2 pixel blocks of contrasting colors in the video region;

drawing an overlay comprising an element that at least partially occludes the display pattern;

encoding the screen image, thereby producing encoded data for the screen image, wherein the encoding the screen image is preceded by chroma subsampling; and sending encoded data for the screen image to a client computing device; and at the client computing device:

receiving the encoded data for the screen image from the server system;

reconstructing the screen image, including decoding the encoded data for the screen image and performing chroma upsampling operations on the screen image, the screen image comprising the overlay drawn over the display pattern;

generating an output overlay image by processing the screen image; and rendering the output overlay image on top of video in the video region.

20. The method of claim 19, wherein generating the output overlay image by processing the screen image at the client computing device comprises:

selectively blending a first group of pixels of the video region with neighboring pixels;

assigning display pattern colors to a second group of the pixels of the video region, respectively, based on color bias;

detecting background pixels among the pixels of the video region;

detecting opaque foreground pixels among the pixels of the video region; and detecting semi-transparent foreground pixels among the pixels of the video region.

* * * * *